US012450742B2

(12) United States Patent
Horiuchi et al.

(10) Patent No.: US 12,450,742 B2
(45) Date of Patent: Oct. 21, 2025

(54) IMAGING SUPPORT APPARATUS, OPERATION METHOD OF IMAGING SUPPORT APPARATUS, AND OPERATION PROGRAM OF IMAGING SUPPORT APPARATUS, FOR REDUCING EXTRA IRRADIATION EXPOSURE OF A SUBJECT

(71) Applicant: FUJIFILM CORPORATION, Tokyo (JP)

(72) Inventors: Hisatsugu Horiuchi, Tokyo (JP); Koji Taninai, Tokyo (JP); Masataka Sugahara, Tokyo (JP); Yuji Kai, Tokyo (JP); Yuji Jibiki, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 406 days.

(21) Appl. No.: 18/170,527

(22) Filed: Feb. 17, 2023

(65) Prior Publication Data

US 2023/0267608 A1 Aug. 24, 2023

(30) Foreign Application Priority Data

Feb. 24, 2022 (JP) ................................ 2022-027160

(51) Int. Cl.
*G06T 7/00* (2017.01)
*A61B 6/42* (2024.01)
(Continued)

(52) U.S. Cl.
CPC .......... *G06T 7/0012* (2013.01); *A61B 6/4208* (2013.01); *G03B 17/561* (2013.01);
(Continued)

(58) Field of Classification Search
CPC ...................... G06T 7/0012; G06T 1/20; G06T 2207/10116; G06T 2207/30008;
(Continued)

(56) References Cited

U.S. PATENT DOCUMENTS

| 2005/0259891 A1* | 11/2005 | Sendai | ................... | A61B 6/025 |
| | | | | 382/294 |
| 2010/0142791 A1* | 6/2010 | Tsuji | ....................... | G06T 11/00 |
| | | | | 382/132 |

(Continued)

FOREIGN PATENT DOCUMENTS

JP 2017-217227 A 12/2017

*Primary Examiner* — Siamak Harandi
(74) *Attorney, Agent, or Firm* — SOLARIS Intellectual Property Group, PLLC

(57) ABSTRACT

A CPU of a console includes a first acquisition unit, a second acquisition unit, a specifying unit, and an extraction unit. The first acquisition unit acquires designation information of a measurement target part of a bone density of a subject. The second acquisition unit acquires an optical image obtained by imaging the subject facing radiography with a camera. The specifying unit specifies a region of the measurement target part in the optical image based on the designation information. The extraction unit extracts a region in a radiation image corresponding to the region of the measurement target part as a measurement region of the bone density based on correspondence relationship information between pixels of the radiation image and pixels of the optical image.

7 Claims, 24 Drawing Sheets

(51) Int. Cl.
    *G03B 17/56*   (2021.01)
    *G06T 1/20*    (2006.01)
(52) U.S. Cl.
    CPC ...... *G06T 1/20* (2013.01); *G06T 2207/10116* (2013.01); *G06T 2207/30008* (2013.01)
(58) Field of Classification Search
    CPC ....... A61B 6/4208; A61B 6/463; A61B 6/461; A61B 6/469; A61B 6/505; G03B 17/561
    See application file for complete search history.

(56)          References Cited

U.S. PATENT DOCUMENTS

| 2019/0188858 | A1* | 6/2019 | Zhu ..................... | A61B 8/5207 |
| 2021/0192219 | A1* | 6/2021 | Agarwal ................ | G06V 20/10 |
| 2022/0249045 | A1* | 8/2022 | Vancamberg ........ | A61B 6/5235 |

\* cited by examiner

IMAGING SUPPORT APPARATUS, OPERATION METHOD OF IMAGING SUPPORT APPARATUS, AND OPERATION PROGRAM OF IMAGING SUPPORT APPARATUS, FOR REDUCING EXTRA IRRADIATION EXPOSURE OF A SUBJECT

CROSS-REFERENCE TO RELATED APPLICATIONS

The present application claims priority under 35 U.S.C. § 119 to Japanese Patent Application No. 2022-027160, filed on Feb. 24, 2022. The above application is hereby expressly incorporated by reference, in its entirety, into the present application.

BACKGROUND

1. Technical Field

The technology of the present disclosure relates to an imaging support apparatus, an operation method of an imaging support apparatus, and an operation program of an imaging support apparatus.

2. Description of the Related Art

There is known a dual-energy X-ray absorptiometry (DEXA) method in which a bone density of a subject is measured based on two radiation images obtained by, for example, irradiating the subject with two types of radiation having different energies using a difference in absorbance of the radiation between a bone tissue and a soft tissue. With the DEXA method, it is possible to contribute to the diagnosis and treatment of osteoporosis which is a major factor, such as a bedridden state.

In the related art, in radiography by the DEXA method, pre-imaging, in which the subject is irradiated with a low-dose radiation, is performed prior to main imaging for measuring the bone density. Then, using a radiation image obtained by the pre-imaging, an operator, such as a medical radiologist, manually designates a measurement region of the bone density (for example, a region surrounding a femoral neck portion or lumbar vertebra). Therefore, JP2017-217227A proposes the technology of reducing a burden on the operator by automatically extracting the measurement region of the bone density from a radiation image obtained by the pre-imaging.

SUMMARY

Both the related-art method in which the operator manually designates the measurement region of the bone density using the radiation image obtained by the pre-imaging and the method disclosed in JP2017-217227A in which the measurement region of the bone density is automatically extracted from the radiation image obtained by the pre-imaging, are completely based on the premise that the pre-imaging by the irradiation with the radiation is performed. Therefore, in both the methods, the subject is still exposed to the extra exposure other than the main imaging.

One embodiment according to the technology of the present disclosure provides an imaging support apparatus, an operation method of an imaging support apparatus, and an operation program of an imaging support apparatus capable of reducing the extra exposure to the subject.

The present disclosure relates to an imaging support apparatus that supports radiography of obtaining a radiation image for measuring a bone density of a subject, the apparatus comprising a processor, in which the processor acquires designation information of a measurement target part of the bone density, acquires an optical image obtained by imaging the subject facing the radiography with a camera, specifies a region of the measurement target part in the optical image based on the designation information, and extracts a region in the radiation image corresponding to the region of the measurement target part as a measurement region of the bone density based on a correspondence relationship between pixels of the radiation image and pixels of the optical image.

It is preferable that the processor specify the region of the measurement target part by performing semantic segmentation processing of identifying an object on the optical image.

It is preferable that the processor determine that positioning of the subject is not appropriate in a case in which an area of the region of the measurement target part specified by the semantic segmentation processing is less than a preset threshold value, and output information corresponding to a determination result.

It is preferable that the processor perform feature point extraction processing of extracting a feature point on the optical image, and specify the region of the measurement target part based on the feature point.

It is preferable that, in a case in which the subject, which has been subjected to the radiography in the past, is subjected to the radiography again, in a case of preparation for imaging before the radiography, the processor perform control of displaying a past optical image obtained during the radiography in the past on a display in a manner of being superimposed on a current optical image.

It is preferable that a position adjustment support function of supporting position adjustment of a radiation source that emits radiation in a case of preparation for imaging before the radiography be provided, further, the radiation source be provided with a light source that emits position display light indicating a position of the radiation source, and the processor emit the position display light from the light source in a case of the preparation for the imaging, acquire the optical image obtained by imaging the subject irradiated with the position display light with the camera, and realize the position adjustment support function by performing control of displaying a mark which is added to the region of the measurement target part specified based on the optical image, the mark indicating a target point of the position of the radiation source, on a display in a manner of being superimposed on the optical image.

The present disclosure relates to an operation method of an imaging support apparatus that supports radiography of obtaining a radiation image for measuring a bone density of a subject, the method comprising acquiring designation information of a measurement target part of the bone density, acquiring an optical image obtained by imaging the subject facing the radiography with a camera, specifying a region of the measurement target part in the optical image based on the designation information, and extracting a region in the radiation image corresponding to the region of the measurement target part as a measurement region of the bone density based on a correspondence relationship between pixels of the radiation image and pixels of the optical image.

The present disclosure relates to an operation program of an imaging support apparatus that supports radiography of obtaining a radiation image for measuring a bone density of a subject, the program causing a computer to execute a process comprising acquiring designation information of a measurement target part of the bone density, acquiring an optical image obtained by imaging the subject facing the radiography with a camera, specifying a region of the measurement target part in the optical image based on the designation information, and extracting a region in the radiation image corresponding to the region of the measurement target part as a measurement region of the bone density based on a correspondence relationship between pixels of the radiation image and pixels of the optical image.

According to the technology of the present disclosure, it is possible to provide the imaging support apparatus, the operation method of the imaging support apparatus, and the operation program of the imaging support apparatus capable of reducing the extra exposure to the subject.

BRIEF DESCRIPTION OF THE DRAWINGS

Exemplary embodiments according to the technique of the present disclosure will be described in detail based on the following figures, wherein:

FIGS. 14A and 14B are diagrams showing processing of a determination unit, in which FIG. 14A shows a case in which the area of the region of the measurement target part is equal to or larger than a threshold value and FIG. 14B shows the area of the region of the measurement target part is less than the threshold value;

DETAILED DESCRIPTION

First Embodiment

Figure 1:
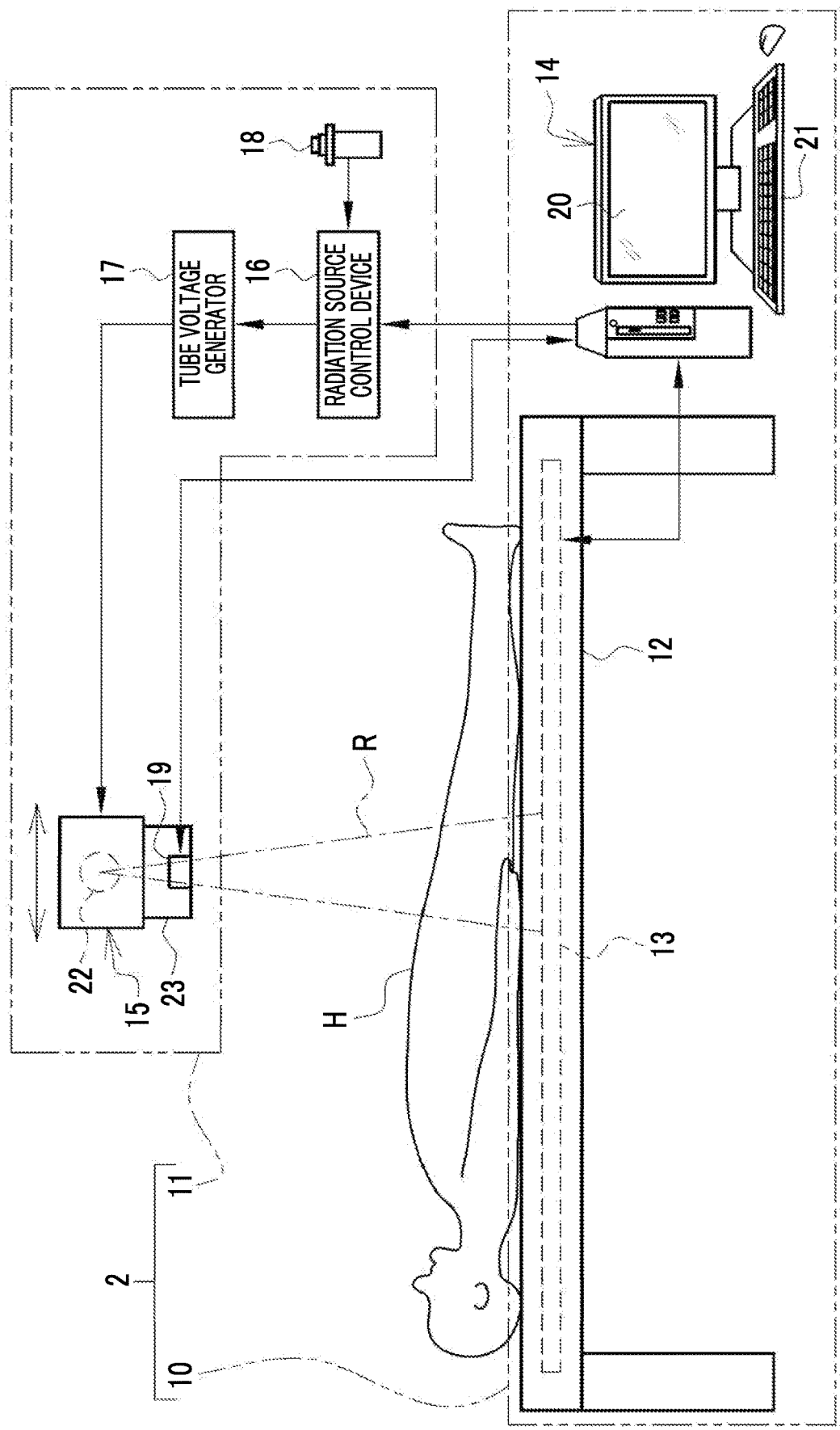
FIG. 1 is a diagram showing a radiography system.

As shown in FIG. 1 as an example, a radiography system 2 is a system that performs radiography of a subject H using radiation R, such as X-rays and γ-rays, in order to measure a bone density of the subject H, and is composed of a radiography apparatus 10 and a radiation generation device 11. The radiography apparatus 10 includes a decubitus imaging table 12, a radiation image detector 13, and a console 14. The radiation generation device 11 includes a radiation source 15, a radiation source control device 16, a tube voltage generator 17, and an irradiation switch 18. A camera 19 is attached to the radiation source 15.

The decubitus imaging table 12 is an imaging table for performing the radiography of the subject H in a decubitus posture. A top plate of the decubitus imaging table 12 has a size such that an adult male can take the decubitus posture with a margin.

The radiation image detector 13 is built in the top plate of the decubitus imaging table 12. The radiation image detector 13 has a size that covers substantially the entire surface of the top plate of the decubitus imaging table 12 (see also FIG. 2). The radiation image detector 13 detects a radiation image 30 (see FIG. 4) corresponding to the radiation R transmitted through the subject H. The radiation image detector 13 is connected to the console 14 in a communicable manner by wire or wirelessly.

The radiation image detector 13 has a first detection panel 41 and a second detection panel 43 (regarding both the detection panels, see FIG. 5) in which a plurality of pixels accumulating charges corresponding to the radiation R are arranged in a two-dimensional matrix. The first detection panel 41 and the second detection panel 43 are also referred to as a flat panel detector (FPD). In a case in which the irradiation with the radiation R is started, the first detection panel 41 and the second detection panel 43 start an accumulation operation of accumulating the charge in the pixel. In a case in which the irradiation with the radiation R ends, the first detection panel 41 and the second detection panel 43 start a readout operation of reading out the charge accumulated in the pixel as an electric signal.

The console 14 is, for example, a desktop personal computer, and is an example of an "imaging support apparatus" according to the technology of the present disclosure. The console 14 includes a display 20 that displays various screens, and an input device 21 that includes a keyboard, a mouse, and the like, and receives an operation instruction of an operator, such as a medical radiologist. The console 14 transmits various signals to the radiation image detector 13. In addition, the console 14 receives the radiation image 30 from the radiation image detector 13. The console 14 displays the radiation image 30 on the display 20. The display 20 is an example of a "display" according to the technology of the present disclosure. It should be noted that the console 14 may be a laptop personal computer, a tablet terminal, or the like.

The radiation source 15 is connected to the decubitus imaging table 12 by a C-arm or the like (not shown). A source to image receptor distance (SID), which is a distance between the radiation source 15 and the top plate of the decubitus imaging table 12, and thus a distance from a generation point of the radiation R to a detection surface of the radiation R of the radiation image detector 13, is fixed. On the other hand, the radiation source 15 can move along a head-caudal direction (long side direction of the decubitus imaging table 12) of the subject H indicated by a double arrow. In addition, the radiation source 15 can also move in a right-left direction (short side direction of the decubitus imaging table 12) of the subject H perpendicular to a paper surface. A position of the radiation source 15 in the head-caudal direction and the right-left direction of the subject H is detected by a linear encoder, for example.

The radiation source 15 includes a radiation tube 22 and an irradiation field limiter 23. The radiation tube 22 is provided with a filament, a target, a grid electrode, and the like (all of which are not shown). A voltage is applied between the filament, which is a cathode, and the target, which is an anode. The voltage applied between the filament and the target is called a tube voltage. The filament releases thermoelectrons corresponding to the applied tube voltage toward the target. The target emits the radiation R by collision of the thermoelectrons from the filament. The grid electrode is disposed between the filament and the target. The grid electrode changes a flow rate of the thermoelectrons from the filament toward the target in accordance with the applied voltage. The flow rate of the thermoelectrons from the filament toward the target is called a tube current.

The irradiation field limiter 23 is also called a collimeter and limits an irradiation field of the radiation R emitted from the radiation tube 22. The irradiation field limiter 23 has a configuration in which, for example, four shielding plates, such as lead, which shield the radiation R are disposed on respective sides of the quadrangle and an emission opening of the quadrangle that transmits the radiation R is formed in a central portion. The irradiation field limiter 23 changes a size of the emission opening by changing a position of each shielding plate, thereby changing the irradiation field of the radiation R.

Figure 2:
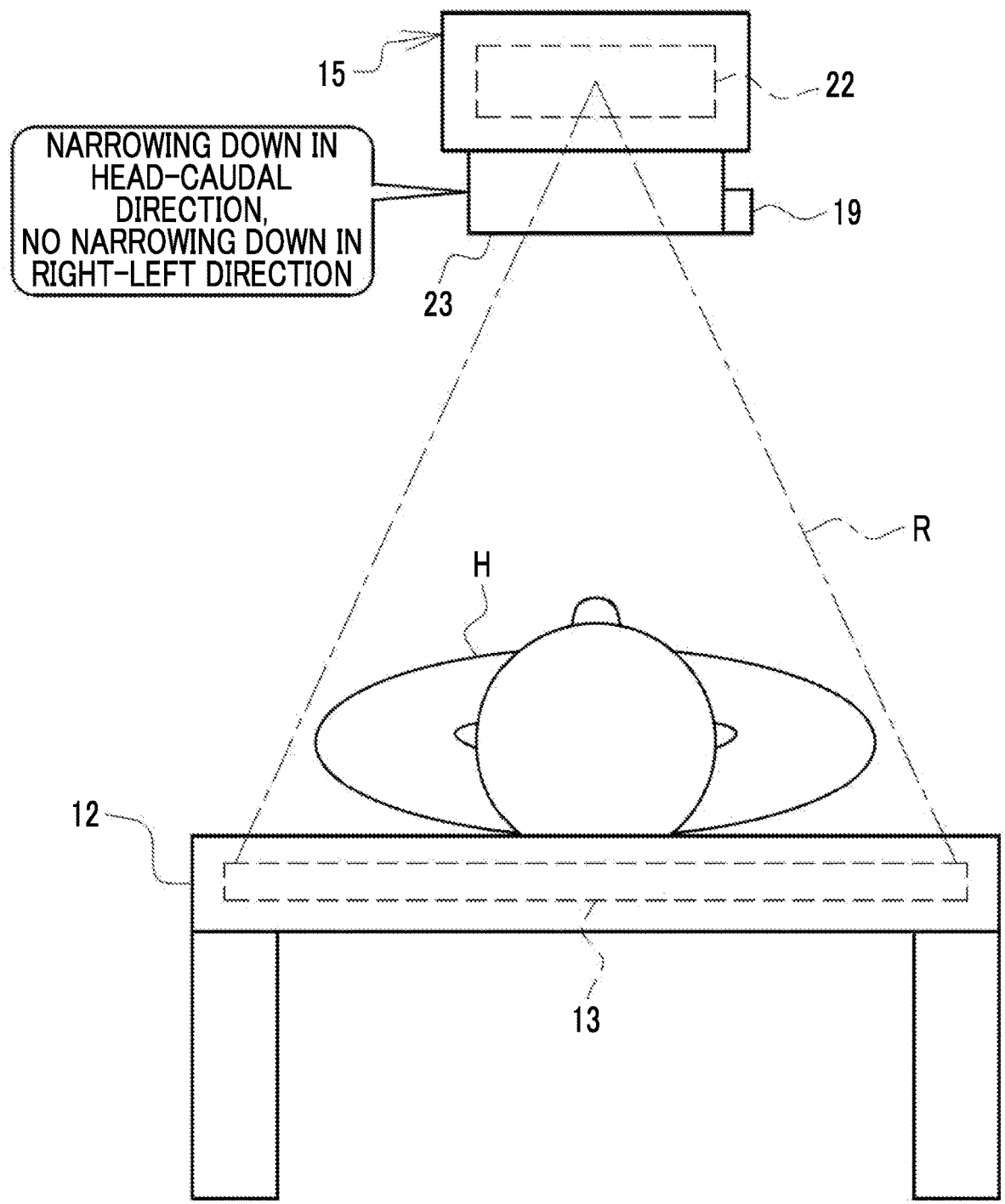
FIG. 2 is a diagram showing radiation seen from a head-caudal direction of a subject.

The irradiation field limiter 23 narrows down an irradiation width of the radiation R in the head-caudal direction of the subject H in order to narrow a range of an irradiation angle of the radiation R in the head-caudal direction of the subject H. On the other hand, as shown in FIG. 2 as an example, the irradiation field limiter 23 does not narrow down the irradiation width of the radiation R in the right-left direction of the subject H, but sets the irradiation width to about the width of the radiation image detector 13.

The tube voltage generator 17 and the irradiation switch 18 are connected to the radiation source control device 16. The radiation source control device 16 controls an operation of the radiation source 15 in response to various instruction signals from the irradiation switch 18. The irradiation switch 18 is operated in a case in which the operator instructs the radiation source 15 to start the irradiation with the radiation R.

An irradiation condition 63 (see FIG. 6) of the radiation R is set in the radiation source control device 16. The irradiation condition 63 is the tube voltage, the tube current, and the irradiation time of the radiation R applied to the radiation tube 22 (see FIG. 6). In a case in which the instruction to start the irradiation with the radiation R is given by the operation of the irradiation switch 18, the radiation source control device 16 operates the tube voltage generator 17 in accordance with the set irradiation condition 63 to emit the radiation R from the radiation tube 22. The radiation source control device 16 stops the irradiation with the radiation R from the radiation tube 22 in a case in which the irradiation time set in the irradiation condition 63 elapses after the irradiation with the radiation R is started. The tube voltage generator 17 generates the tube voltage by boosting an input voltage with a transformer. The tube voltage generated by the tube voltage generator 17 is supplied to the radiation tube 22 through a voltage cable (not shown).

It should be noted that the irradiation with the radiation R may end by an auto exposure control (AEC) function. The AEC function is a function of detecting the dose of the radiation R during the irradiation with the radiation R, and stopping the irradiation of the radiation R from the radiation tube 22 at a point in time at which a cumulative dose which is an integrated value of the detected dose, reaches a preset target dose. In this case, the first detection panel 41 and the second detection panel 43 of the radiation image detector 13 start the readout operation in a case in which the cumulative dose of the radiation R reaches the target dose.

Figure 3:
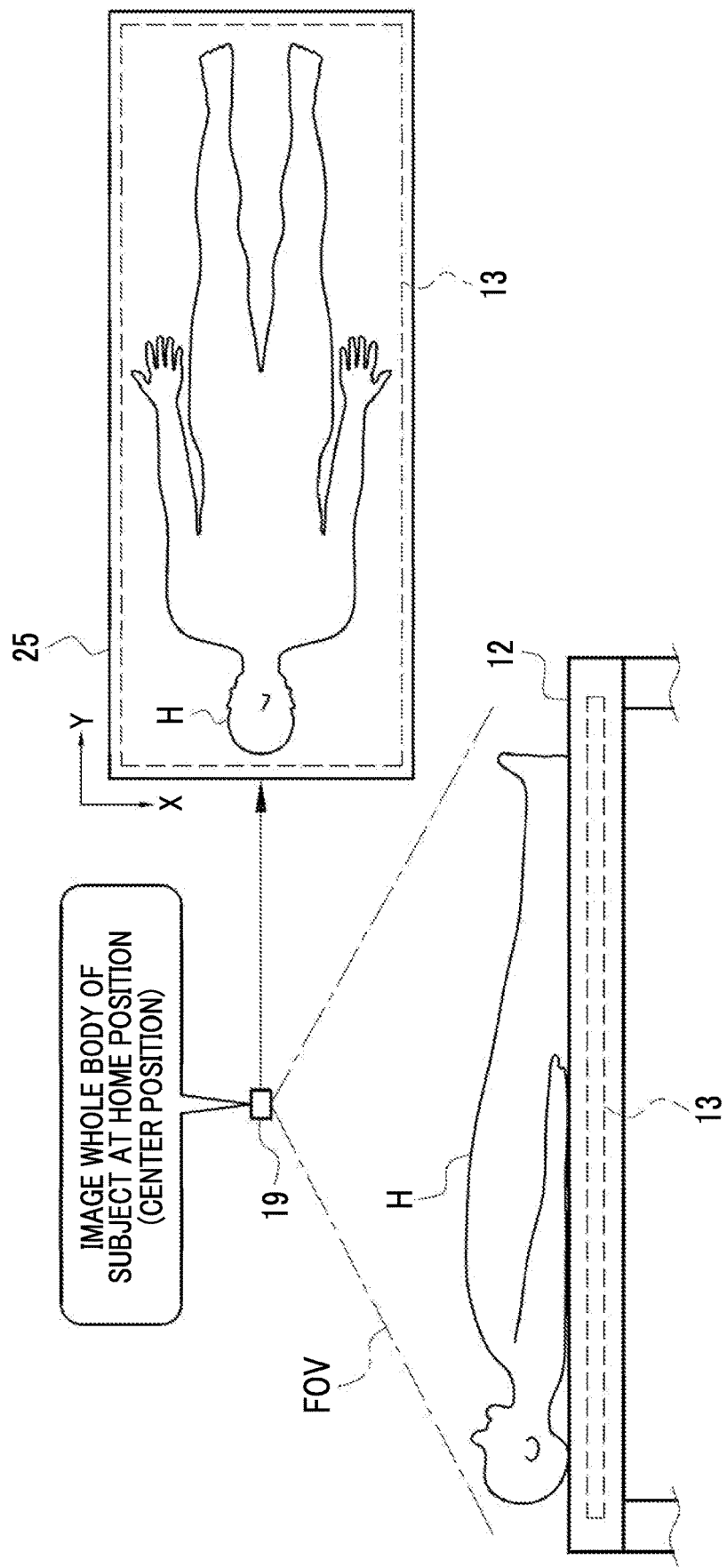
FIG. 3 is a diagram showing a state in which an optical image is captured by a camera.

The camera 19 is a digital camera which captures a digital optical image 25 (see FIG. 3). The camera 19 is attached to the center of a distal end of the irradiation field limiter 23 of the radiation source 15. The camera 19 is connected to the console 14 in a communicable manner by wire or wirelessly. The camera 19 images the subject H lying down on the decubitus imaging table 12 for the radiography in response to an imaging instruction from the console 14. The imaging instruction for the optical image 25 to the camera 19 through the console 14 is, for example, given by the operator after guiding the subject H from the waiting room to the radiography room and causing the subject H to lie down on the decubitus imaging table 12. The camera 19 transmits the captured optical image 25 to the console 14. It should be noted that the camera 19 may be built in the irradiation field limiter 23. In addition, the camera 19 may be attached to a ceiling or a wall of the radiography room instead of the radiation source 15.

FIG. 3 shows an example of a state in which the camera 19 images the subject H lying down on the decubitus imaging table 12 in response to the imaging instruction from the operator. In this case, the radiation source 15 and thus the camera 19 are positioned at a home position, which is a center position of the decubitus imaging table 12 in the long side direction and the short side direction. In the home position, the camera 19 has a field of view FOV capable of imaging, without any corners, the whole body of the subject H lying down on the decubitus imaging table 12 and the entire radiation image detector 13 built in the top plate of the decubitus imaging table 12. In the optical image 25 captured by the camera 19 in this way, the whole body of the subject H lying down on the decubitus imaging table 12 and the entire radiation image detector 13 built in the top plate of the decubitus imaging table 12 are shown.

Figure 4:
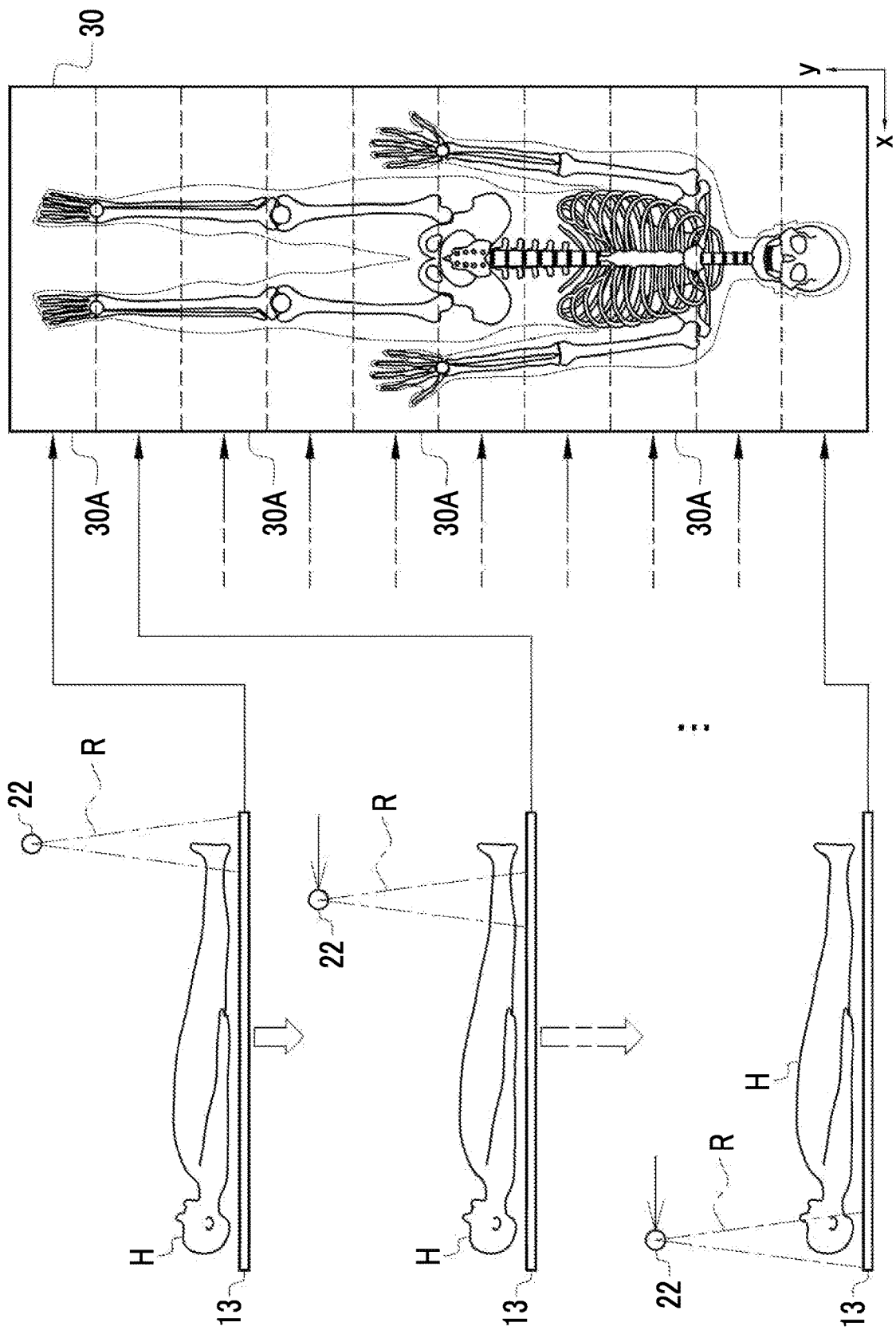
FIG. 4 is a diagram showing a state of radiography and formation of a radiation image.

As shown in FIG. 4 as an example, in the radiography, the radiation source 15 and thus the radiation tube 22 move along the head-caudal direction from the toes to the crown of the subject H under the control of the radiation source control device 16. In the process, the radiation tube 22 irradiates the subject H with the radiation R in a pulse form a total of 10 times under the control of the radiation source control device 16. The radiation image detector 13 outputs a fragmentary radiation image 30A each time the irradiation with the radiation R is performed. By joining the fragmentary radiation images 30A together, one radiation image 30 covering the whole body skeleton of the subject H is obtained. Contrary to the example, the radiation source 15 (radiation tube 22) may be moved from the crown to the toes of the subject H. It should be noted that it is also possible to image a specific part, such as the femoral neck portion in a pinpoint manner, instead of the whole body (see a fifth embodiment).

Figure 5:
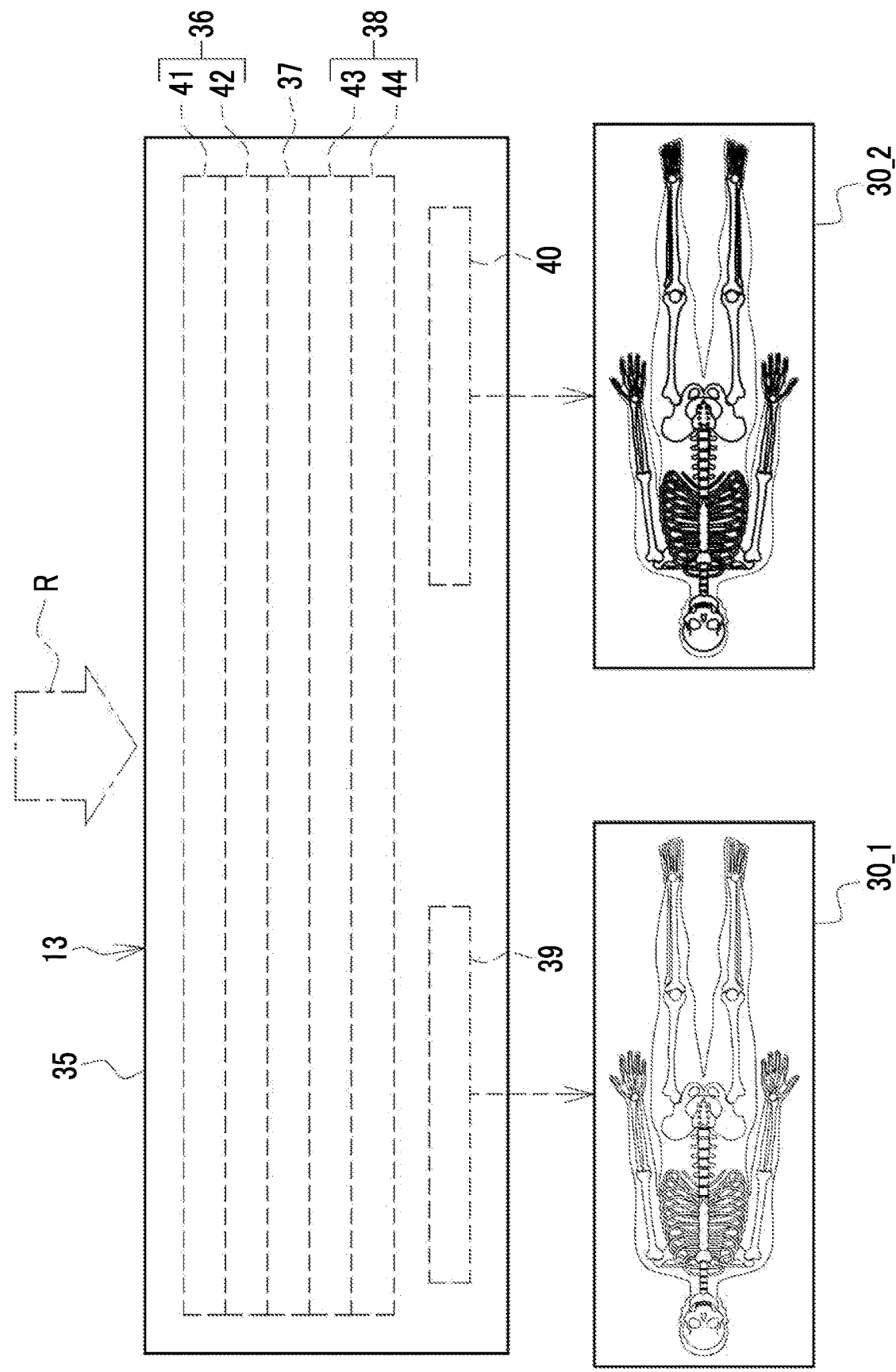
FIG. 5 is a diagram showing an internal configuration of a radiation image detector.

As shown in FIG. 5 as an example, the radiation image detector 13 comprises a housing 35. A first radiation detection unit 36, a radiation restriction plate 37, a second radiation detection unit 38, a first circuit unit 39, a second circuit unit 40, and the like are built in the housing 35. The first radiation detection unit 36, the radiation restriction plate 37, and the second radiation detection unit 38 are laminated in this order as viewed from a front surface side of the housing 35 on which the radiation R is incident. That is, the radiation image detector 13 is a laminated type. Specifically, the radiation image detector 13 has a product name of "CALNEO Dual" (manufactured by FUJIFILM Corporation) or the like.

The first radiation detection unit 36 is composed of the first detection panel 41 and a first scintillator 42. The second radiation detection unit 38 is composed of the second detection panel 43 and a second scintillator 44. The first detection panel 41 and the first scintillator 42 are laminated in this order as viewed from the front surface side of the housing 35. In addition, the second detection panel 43 and the second scintillator 44 are laminated in this order as viewed from the front surface side of the housing 35.

The first scintillator 42 and the second scintillator 44 have phosphors, and the incident radiation R is converted into visible light and released. The first scintillator 42 and the second scintillator 44 have different phosphors. The first scintillator 42 has, for example, thallium-activated cesium iodide (CsI:Tl) as the phosphor. The second scintillator 44 has, for example, terbium-activated gadolinium oxysulfide ($Gd_2O_2S$:Tb, GOS) as the phosphor.

The first detection panel 41 and the second detection panel 43 detect the visible light released from the first scintillator 42 and the second scintillator 44 and convert the detected visible light into the electric signal. As described above, the first detection panel 41 and the second detection panel 43 have a plurality of pixels arranged in a two-dimensional matrix. As is well known, the pixel has a switching element, such as a photoelectric conversion unit that generates and accumulates the charge (electron-hole pair) by the incidence of the visible light, and a thin film transistor (TFT) that controls the accumulation of the charge in the photoelectric conversion unit and the readout of the charge from the photoelectric conversion unit.

The first circuit unit 39 controls the drive of the switching element or the like of the first detection panel 41, and generates a first radiation image 30_1 based on the electric signal output from the first detection panel 41. Similarly, the second circuit unit 40 controls the drive of the switching element or the like of the second detection panel 43, and generates a second radiation image 30_2 based on the electric signal output from the second detection panel 43. That is, in the radiography shown in FIG. 4, two images, the first radiation image 30_1 and the second radiation image 30_2, are generated as one radiation image 30 covering the skeleton of the whole body of the subject H. In the following description, the first radiation image 30_1 and the second radiation image 30_2 are collectively referred to as the radiation image 30. It should be noted that the first detection panel 41 and the first scintillator 42 may be laminated in an order of the first scintillator 42 and the first detection panel 41 as viewed from the front surface side of the housing 35. The same applies to the second detection panel 43 and the second scintillator 44. In addition, the radiation image detector 13 may be a direct conversion type that directly converts the radiation R into the electric signal instead of an indirect conversion type that converts the radiation R as the visible light by the first scintillator 42 and the second scintillator 44 of the present example into the electric signal.

The radiation restriction plate 37 restricts the dose of the radiation R that is transmitted through the first radiation detection unit 36 and emitted to the second radiation detection unit 38. The radiation restriction plate 37 consist of, for example, copper or tin. Since the radiation R is absorbed by the radiation restriction plate 37 and the first radiation detection unit 36, the second radiation detection unit 38 is irradiated with the radiation R having a lower dose than the first radiation detection unit 36. In addition, the radiation restriction plate 37 absorbs a large amount of a low energy component (also referred to as a soft ray component) of the radiation R. Therefore, the second radiation detection unit 38 is irradiated with the radiation R of which the energy distribution is biased to a high energy component (also referred to as a hard ray component). That is, with the radiation image detector 13, the same effect as in a case of the irradiation with two types of the radiation R having different energy distributions is obtained by the irradiation with the radiation R once.

In the first radiation image 30_1 and the second radiation image 30_2, both a bone tissue, such as a rib and spine, and a soft tissue, such as a lung and a stomach, are shown. It should be noted that the energies of the radiation R that is easily absorbed are different between the bone tissue and the soft tissue. Therefore, the bone tissue shown in the first radiation image 30_1 and the bone tissue shown in the second radiation image 30_2 have different pixel values. In addition, the soft tissue shown in the first radiation image 30_1 and the soft tissue shown in the second radiation image 30_2 also have different pixel values.

It should be noted that the radiation image detector 13 may have one built-in radiation detection unit. In this case, for example, two radiation tubes 22 for the irradiation with two types of radiation R having different energies are provided in the radiation source 15. Then, the irradiation with two types of the radiation R having different energies are performed twice from the two radiation tubes 22 and the radiation R is detected by the radiation image detector 13 each irradiation, thereby acquiring the first radiation image 30_1 and the second radiation image 30_2.

Figure 6:
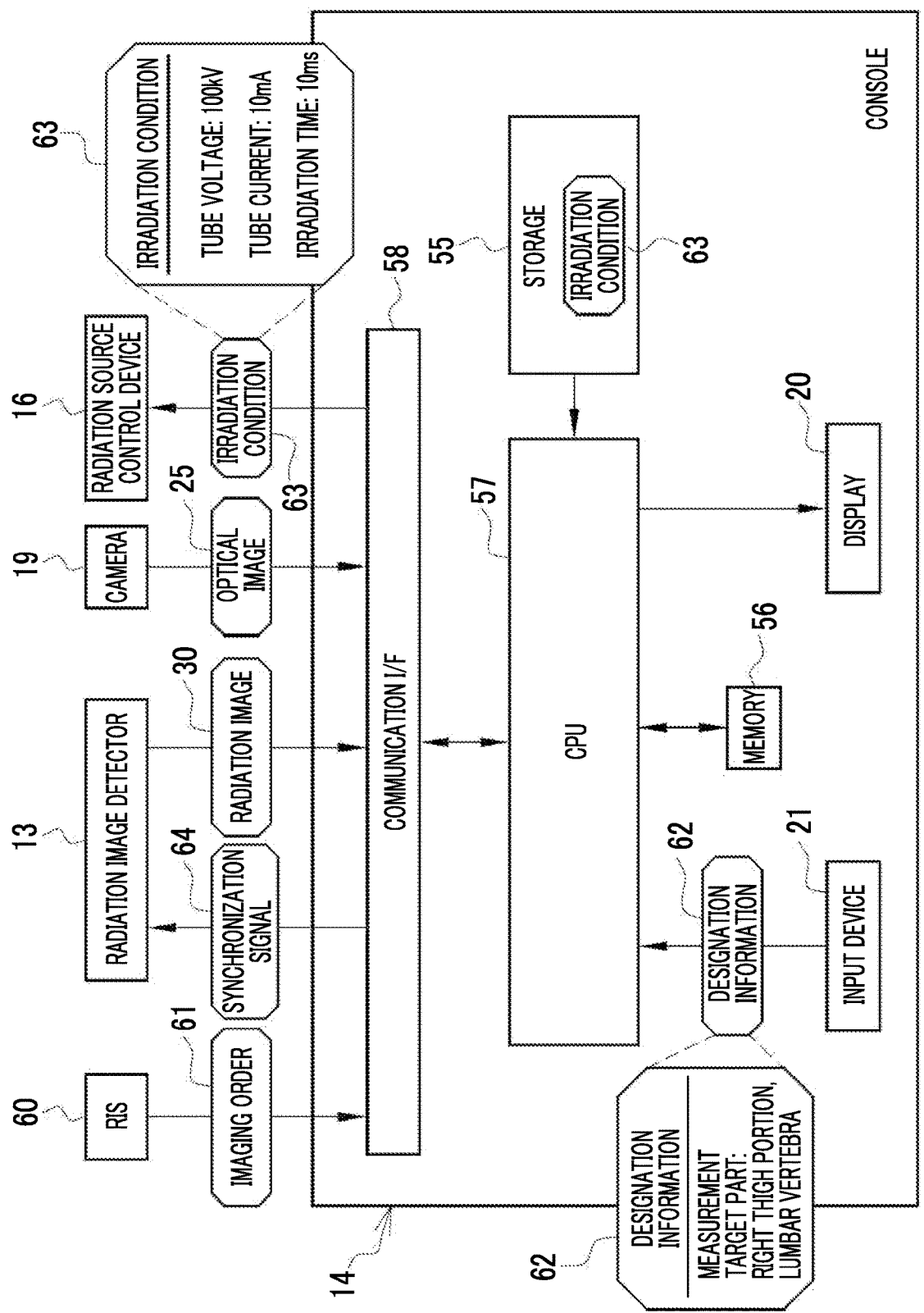
FIG. 6 is a block diagram showing a configuration of a console.

As shown in FIG. 6 as an example, the console 14 comprises a storage 55, a memory 56, a central processing unit (CPU) 57, and a communication interface (I/F) 58, in addition to the display 20 and the input device 21 described above. The display 20, the input device 21, the storage 55, the memory 56, the CPU 57, and the communication I/F 58 are connected to each other via a busline (not shown). The storage 55, the memory 56, the CPU 57, and the busline are examples of a "computer" according to the technology of the present disclosure.

The storage 55 is a hard disk drive built in the computer constituting the console 14 or connected to the computer through a cable or a network. In the storage 55, a control program, such as an operating system, various application programs, various data associated with such programs, and the like are stored. It should be noted that a solid state drive may be used instead of the hard disk drive.

The memory 56 is a work memory for the CPU 57 to execute processing. The CPU 57 loads the program stored in the storage 55 into the memory 56 and executes the processing in accordance with the program. As a result, the CPU 57 controls each unit of the computer in an integrated manner. The CPU 57 is an example of a "processor" according to the technology of the present disclosure. It should be noted that the memory 56 may be built in the CPU 57. The communication I/F 58 controls transmission of various types of information with an external device, such as the radiation image detector 13.

The CPU 57 receives an imaging order 61 from the radiology information system (RIS) 60 via the communication I/F 58. In the imaging order 61, a subject identification data (ID) 131 (see FIG. 20) for identifying the subject H, an instruction of a measurement target part of the bone density by a doctor or the like of a medical department who has issued the imaging order 61, and the like are registered. The CPU 57 displays the imaging order 61 on the display 20 in response to the operation of the operator by the input device 21. The operator confirms a content of the imaging order 61 through the display 20.

The CPU 57 displays the bone density measurement target part on the display 20 in a selectable manner. In addition to the shown right thigh portion and lumbar vertebra, the measurement target parts include the right shin portion, the left shin portion, the left thigh portion, the pelvis portion, the thoracic vertebra, and the head portion. The operator operates the input device 21 to select, from among a plurality of types of measurement target parts, a measurement target part that matches the measurement target part designated in the imaging order 61. As a result, designation information 62 of the measurement target part is input to the CPU 57. It should be noted that limbs may be added to the measurement target part.

The irradiation condition 63 is stored in the storage 55. The CPU 57 reads out the irradiation condition 63 from the storage 55 and transmits the read out irradiation condition 63 to the radiation source control device 16 via the communication I/F 58. As described above, the irradiation condition 63 is the tube voltage and the tube current applied to the radiation tube 22, and the irradiation time of the radiation R. Instead of the tube current and the irradiation time, a tube current irradiation time product may be set as the irradiation condition 63.

Although not shown, in a case in which the radiation source control device 16 is instructed to start the irradiation with the radiation R through the irradiation switch 18, the CPU 57 receives an irradiation start signal indicating that the irradiation with the radiation R is started from the radiation source control device 16. In a case in which the irradiation start signal is received, the CPU 57 transmits a synchronization signal 64 indicating that the irradiation with the radiation R is started to the radiation image detector 13. Further, the CPU 57 receives an irradiation end signal indicating that the irradiation with the radiation R ends from the radiation source control device 16. In a case in which the irradiation end signal is received, the CPU 57 transmits the synchronization signal 64 indicating that the irradiation with the radiation R ends to the radiation image detector 13.

In a case in which the synchronization signal 64 indicating that the irradiation with the radiation R is started is received from the console 14, the radiation image detector 13 causes the first detection panel 41 and the second detection panel 43 to start the accumulation operation. In addition, in a case in which the synchronization signal 64 indicating that the irradiation with the radiation R ends is received from the console 14, the radiation image detector 13 causes the first detection panel 41 and the second detection panel 43 to start the readout operation. It should be noted that the radiation image detector 13 may be provided with a function of detecting the start of the irradiation with the radiation R and the end of the irradiation with the radiation R. Then, the first detection panel 41 and the second detection panel 43 may be caused to start the accumulation operation in a case in which the start of the irradiation with the radiation R is detected by the function, and the first detection panel 41 and the second detection panel 43 may be caused to start the readout operation in a case in which the end of the irradiation with the radiation R is detected.

The CPU 57 receives the radiation image 30 from the radiation image detector 13 via the communication I/F 58. The CPU 57 performs various types of image processing on the radiation image 30 and then displays the radiation image 30 on the display 20 and provides the radiation image 30 for viewing by the operator. In addition, the CPU 57 measures the bone density of the measurement target part designated by the designation information 62 based on the radiation image 30, displays the measurement result on the display 20, and provides the measurement result for viewing by the operator.

Although not shown, the CPU 57 transmits the imaging instruction to the camera 19 via the communication I/F 58. The CPU 57 receives the optical image 25 captured by the camera 19 in response to the imaging instruction.

Figure 7:
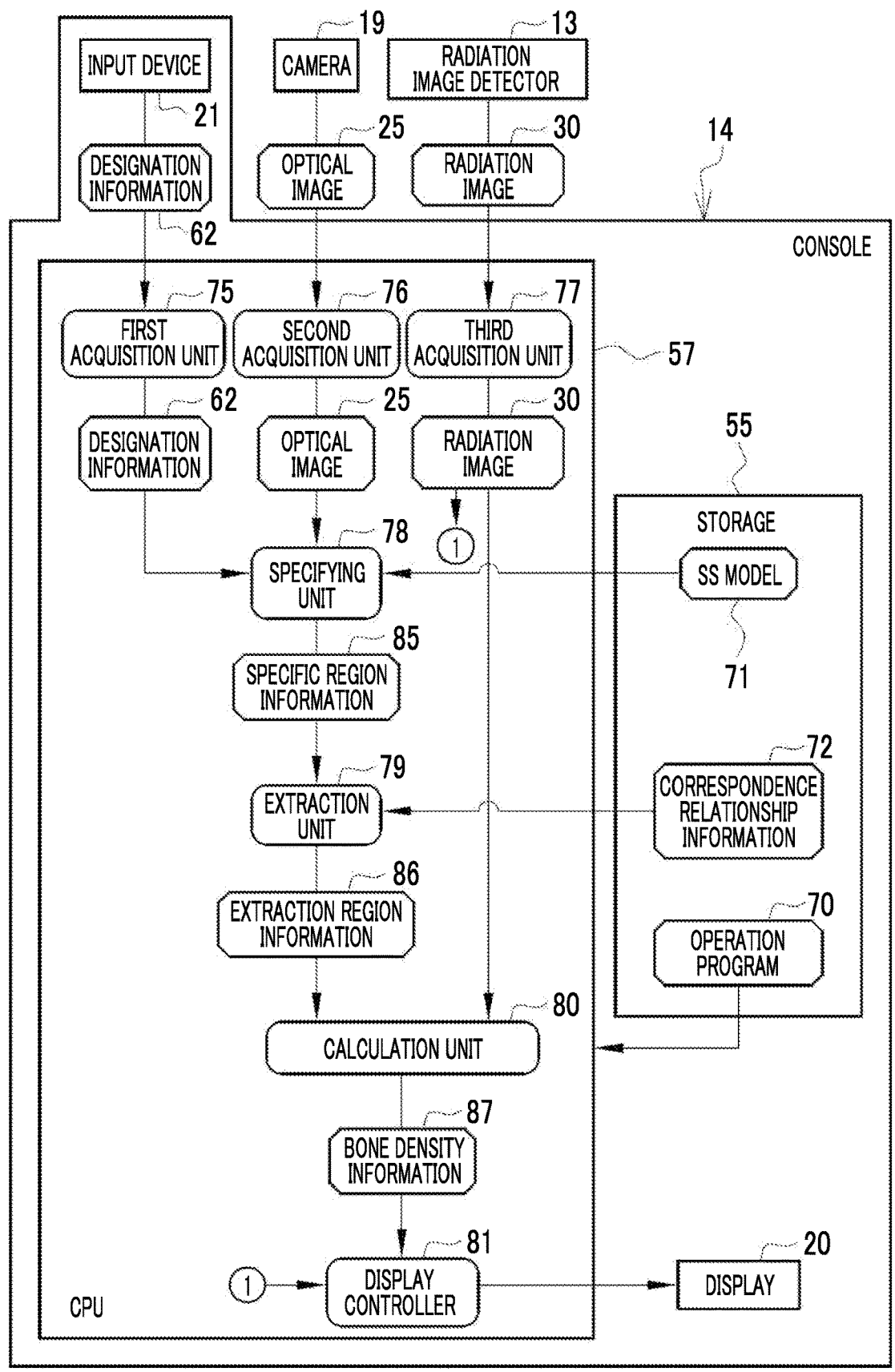
FIG. 7 is a block diagram showing a processing unit of a CPU of the console.

As shown in FIG. 7 as an example, an operation program 70 is stored in the storage 55. The operation program 70 is an application program causing the computer to function as the imaging support apparatus. That is, the operation program 70 is an example of an "operation program of an imaging support apparatus" according to the technology of the present disclosure. The storage 55 also stores a semantic segmentation (hereinafter, referred to as SS) model 71, correspondence relationship information 72, and the like.

In a case in which the operation program 70 is activated, the CPU 57 cooperates with the memory 56 and the like to function as a first acquisition unit 75, a second acquisition unit 76, a third acquisition unit 77, a specifying unit 78, an extraction unit 79, a calculation unit 80, and a display controller 81.

The first acquisition unit 75 acquires the designation information 62 of the measurement target part designated through the input device 21, and the first acquisition unit 75 outputs the designation information 62 to the specifying unit 78. The second acquisition unit 76 acquires the optical image 25 from the camera 19. The second acquisition unit 76 outputs the optical image 25 to the specifying unit 78. The third acquisition unit 77 acquires the radiation image 30 from the radiation image detector 13. The third acquisition unit 77 outputs the radiation image 30 to the calculation unit 80 and the display controller 81.

The specifying unit 78 specifies a region SA (see FIG. 8) of the measurement target part in the optical image 25 by performing SS processing of identifying an object using the SS model 71 on the optical image 25. The specifying unit 78 outputs specific region information 85, which is the information of the region SA of the specified measurement target part, to the extraction unit 79.

The extraction unit 79 extracts the region in the radiation image 30 corresponding to the region SA of the specified measurement target part as a measurement region EA (see FIG. 9) of the bone density based on the correspondence relationship information 72 and the specific region information 85. The extraction unit 79 outputs extraction region information 86, which is the information of the measurement region EA of the extracted bone density, to the calculation unit 80.

The calculation unit 80 calculates the bone density of the measurement region EA represented by the extraction region information 86 in the radiation image 30 by using, for example, the method disclosed in JP2018-192056A. The calculation unit 80 outputs bone density information 87, which is information of the calculated bone density, to the display controller 81.

The display controller 81 performs control of displaying various screens on the display 20. The various screens include a display screen of the imaging order 61, a designation screen of the measurement target part, and a measurement result display screen 95 (see FIG. 10) showing the measurement result of the bone density. It should be noted that, although not shown, in the CPU 57, in addition to the processing units 75 to 81, a reception unit (see FIG. 20) that receives the imaging order 61 from the RIS 60, an image processing unit that performs various types of image processing on the radiation image 30, a setting unit that sets the irradiation condition 63 in the radiation source control device 16, and the like are constructed.

In the following, a case in which the right thigh portion and the lumbar vertebra are designated as the measurement target parts will be described as an example.

Figure 8:
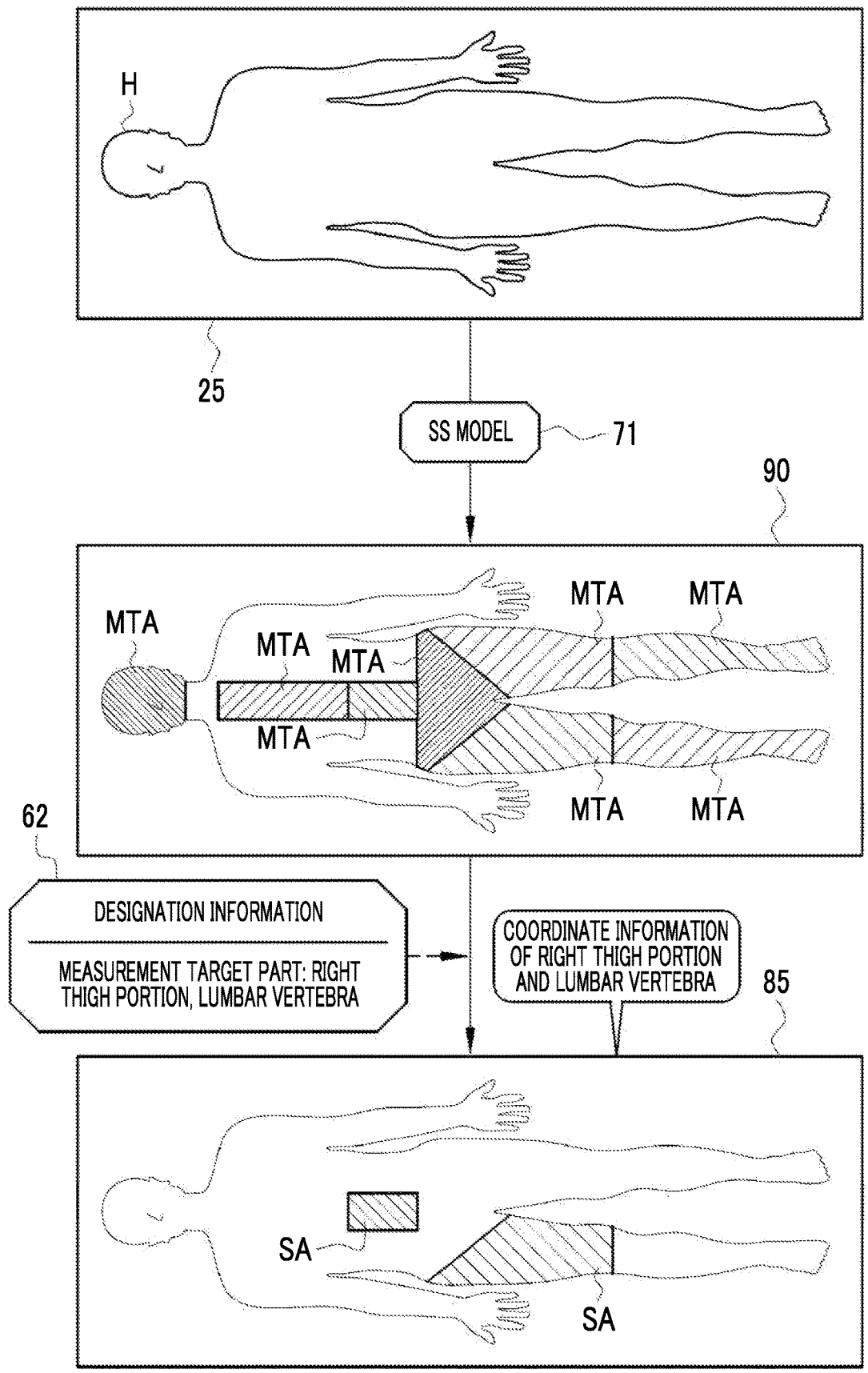
FIG. 8 is a diagram showing processing of a specifying unit.

As shown in FIG. 8 as an example, the specifying unit 78 inputs the optical image 25 to the SS model 71 and outputs an SS image 90 from the SS model 71. The SS model 71 is a machine learning model that has been trained to identify a region MTA of all the measurement target parts (right shin portion, left shin portion, right thigh portion, left thigh portion, pelvis portion, thoracic vertebra, and head portion) of the subject H shown in the optical image 25 in pixel units, and is, for example, composed of a convolutional neural network.

In the SS image 90, the specifying unit 78 specifies the region MTA of the measurement target part designated by the designation information 62 as the region SA of the measurement target part in the region MTA of each measurement target part identified by the SS model 71. Here, since the designated measurement target parts are the right thigh portion and the lumbar vertebra, the specifying unit 78 specifies the regions MTA of the right thigh portion and the lumbar vertebra as the region SA of the measurement target part. Then, coordinate information of a pixel OI (X, Y) (see FIG. 9) constituting the regions MTA of the right thigh portion and the lumbar vertebra is output to the extraction unit 79 as the specific region information 85. It should be noted that an X-axis is a direction along a short side of the decubitus imaging table 12, and a Y-axis is a direction along a long side of the decubitus imaging table 12.

Figure 9:
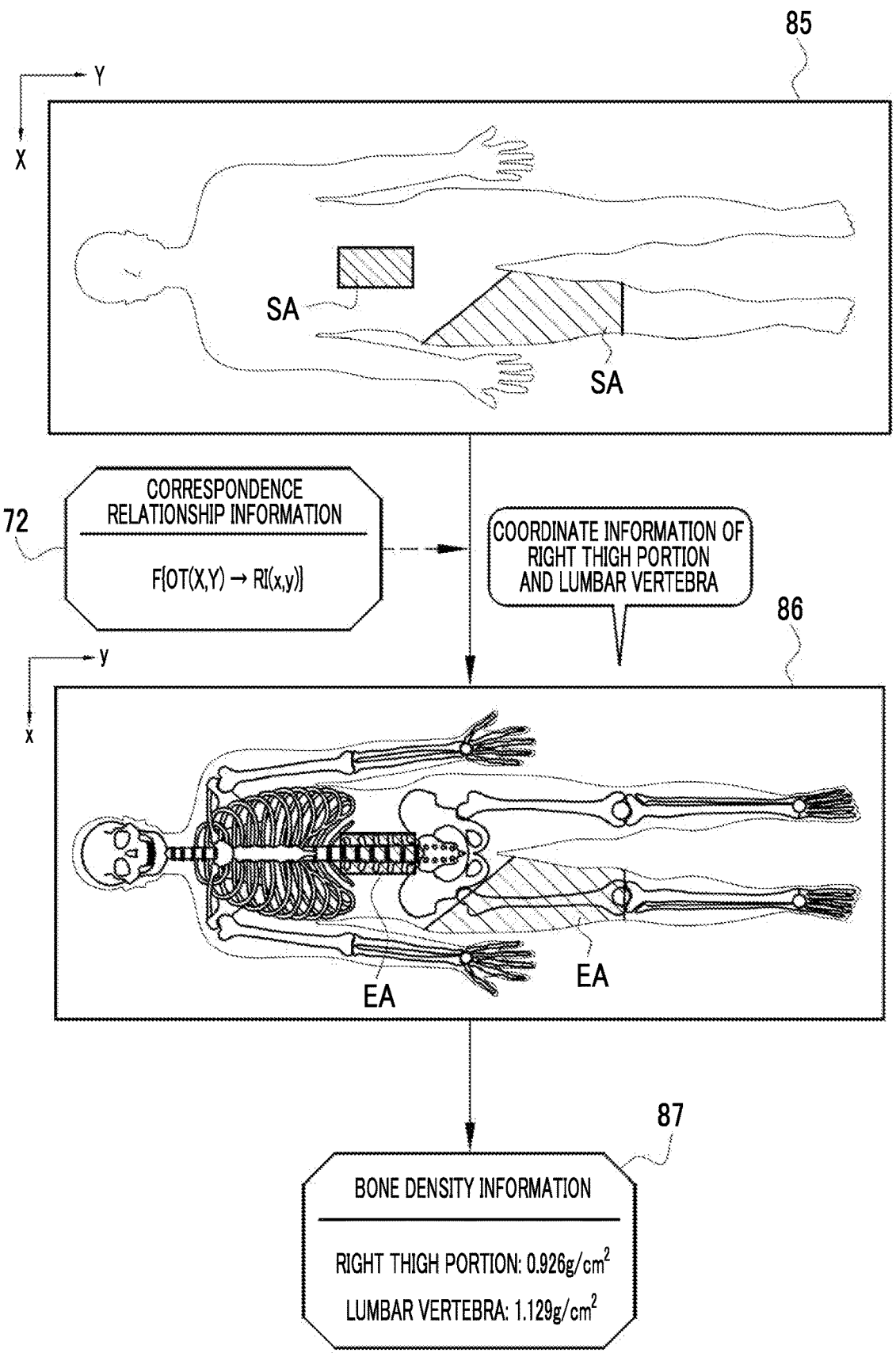
FIG. 9 is a diagram showing processing of an extraction unit and a calculation unit.

As shown in FIG. 9 as an example, the correspondence relationship information 72 includes a function F for converting the pixel OI (X, Y) of the optical image 25 captured by the camera 19 at the home position shown in FIG. 3 into a pixel RI (x, y) of the radiation image 30. The extraction unit 79 uses the function F to convert each pixel OI (X, Y) of the region SA of the specific region information 85 of the measurement target part into the pixel RI (x, y), thereby extract the measurement region EA of the bone density. The extraction region information 86 is the coordinate information of the pixel RI (x, y) of the measurement region EA of the bone density extracted in this way, in this case, the regions of the right thigh portion and the lumbar vertebra. It should be noted that an x-axis is a direction along the short side of the decubitus imaging table 12, and a y-axis is a direction along the long side of the decubitus imaging table 12.

In addition, as shown in FIG. 9, the calculation unit 80 calculates the bone densities of the right thigh portion and the lumbar vertebra based on the extraction region information 86 indicating the regions SA of the right thigh portion and the lumbar vertebra. Incidentally, the unit of the bone density is $g/cm^2$.

Figure 10:
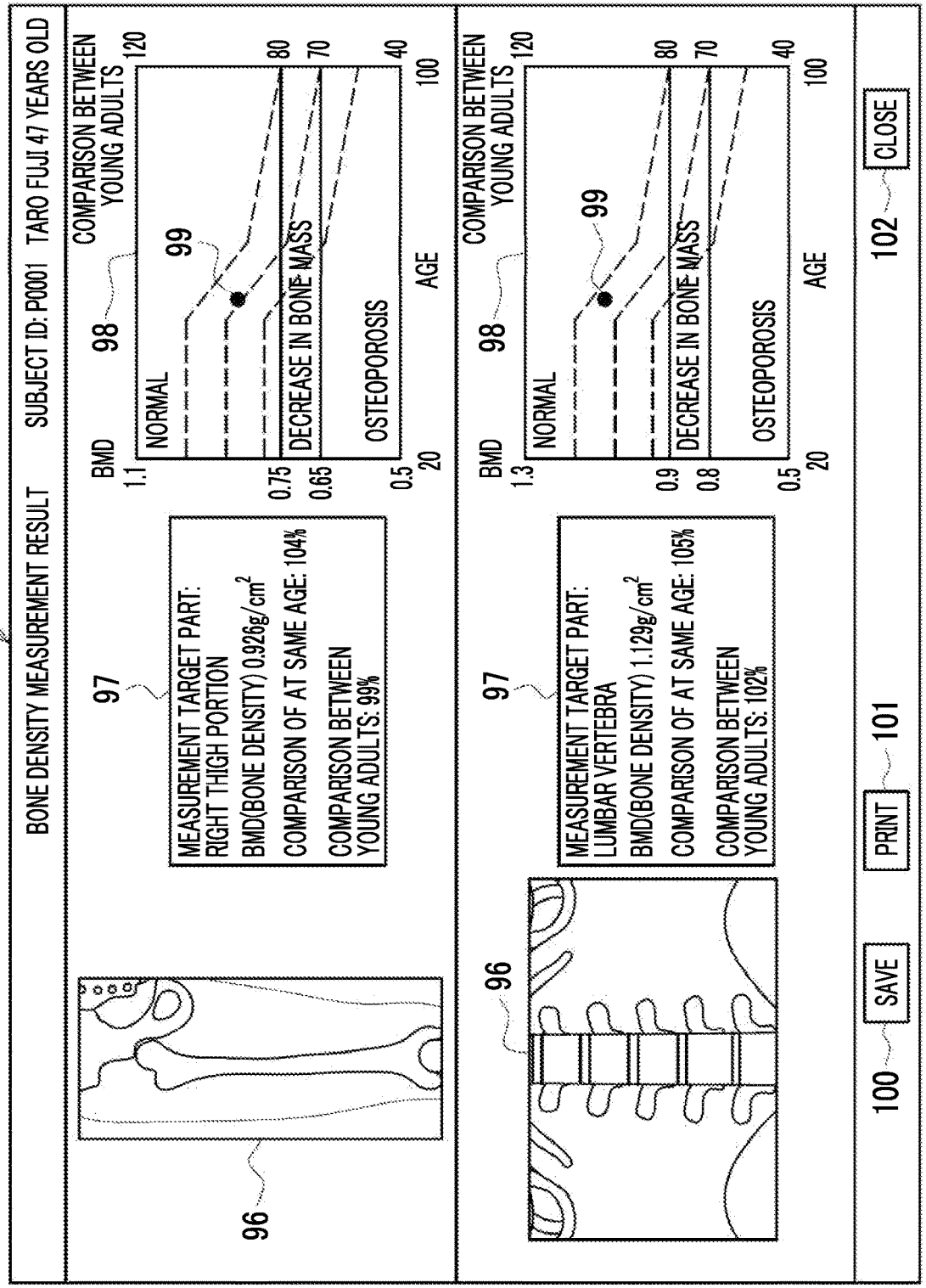
FIG. 10 is a diagram showing a measurement result display screen.

As shown in FIG. 10 as an example, a cutout image 96, detailed information 97, and a graph 98 are displayed for each measurement target part on the measurement result display screen 95. The cutout image 96 is an image obtained by cutting out the measurement target part from the radiation image 30. In the detailed information 97, the measurement target part, the bone density, a comparison of the bone density at the same age, and a comparison of the bone density between young adults are displayed. The comparison of the bone density at the same age is a comparison between the subject H and an average value of the bone densities of another subject H of the same age. The comparison of the bone density between young adults is a comparison with an average value of the bone density of adults aged 20 to 44 years. The graph 98 shows the age on a horizontal axis and the bone density and the comparison between young adults on a vertical axis. A point 99 indicating the bone density of the subject H is plotted on the graph 98.

A save button 100, a print button 101, and a close button 102 are provided on a lower portion of the measurement result display screen 95. In a case in which the save button 100 is selected, the measurement result of the bone density is stored in the storage 55. The measurement result of the bone density stored in the storage 55 is registered in, for example, an electronic medical record of an electronic medical record system connected to the console 14 via a network. In a case in which the print button 101 is selected, the content displayed on the measurement result display screen 95 is printed on a paper medium. The paper medium is distributed to the subject H. In a case in which the close button 102 is selected, the measurement result display screen 95 is closed.

Figure 11:
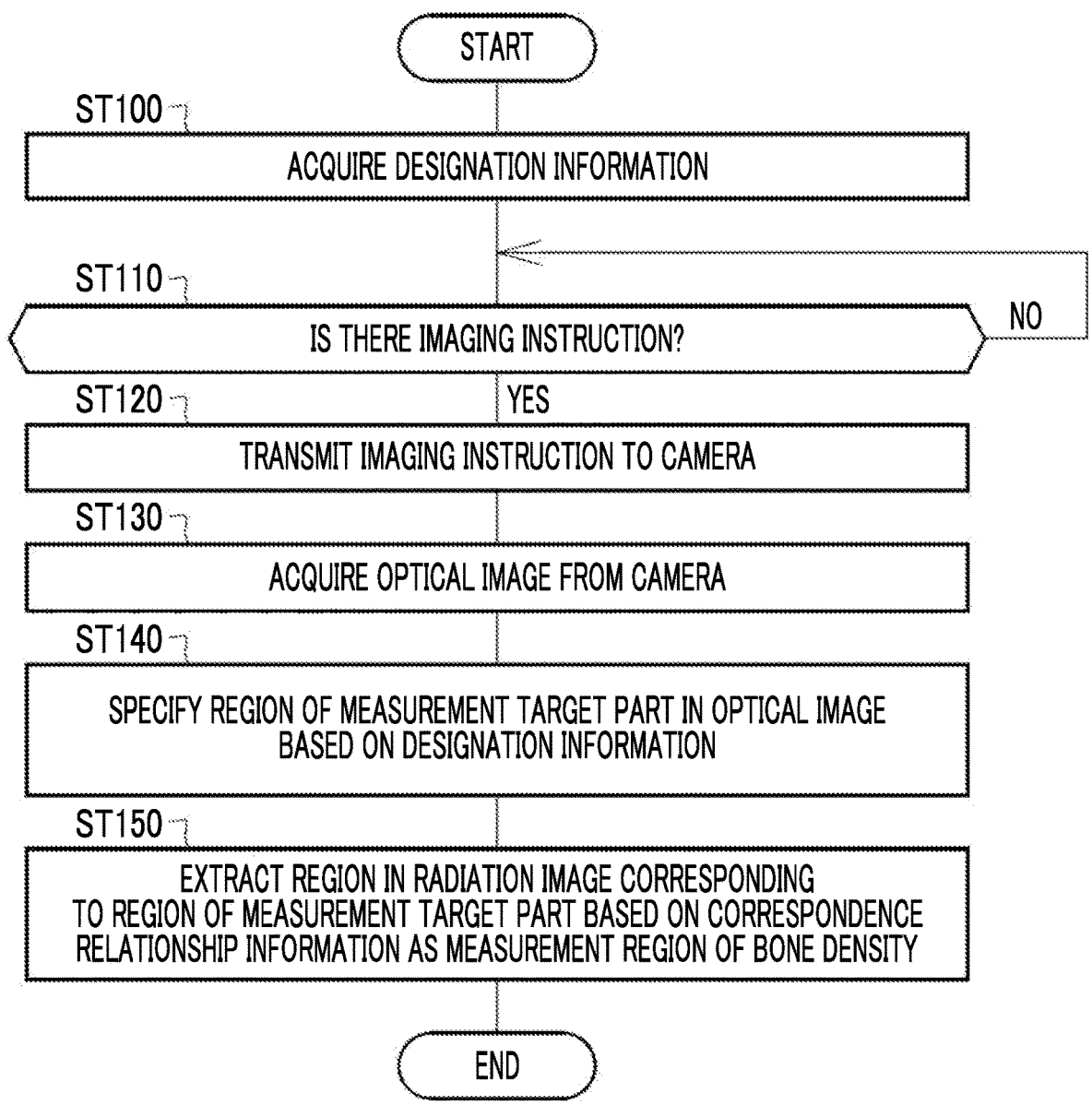
FIG. 11 is a flowchart showing a processing procedure of the console.
Figure 12:
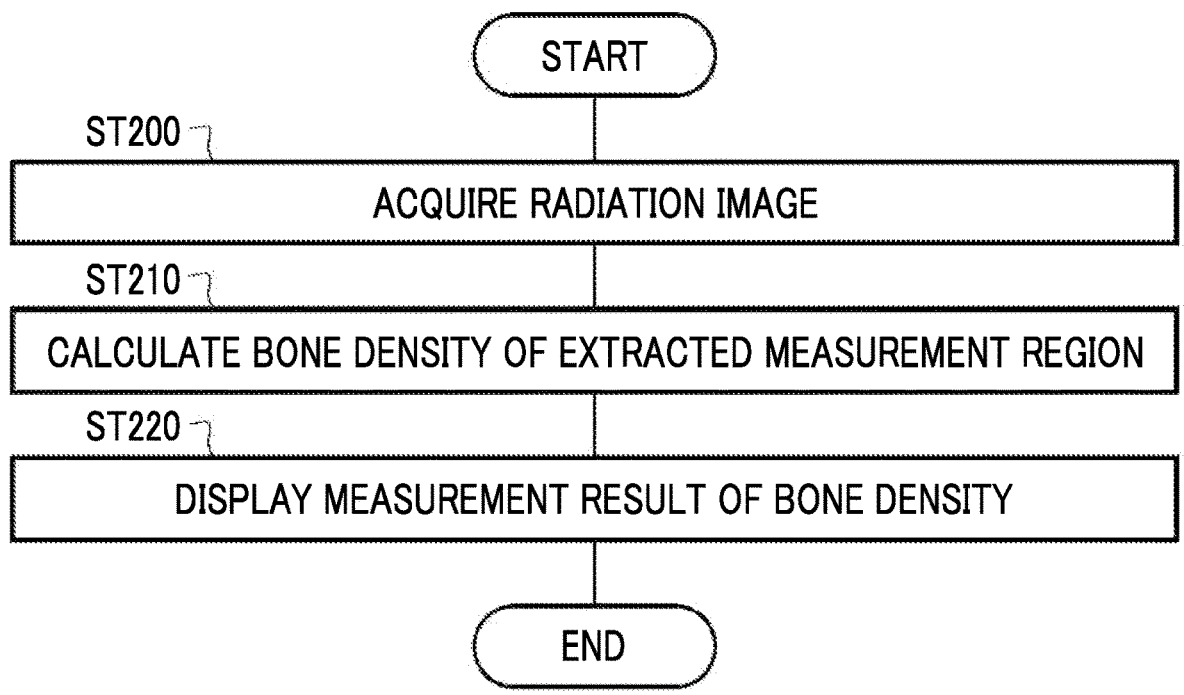
FIG. 12 is a flowchart showing the processing procedure of the console.

Next, an action with the configuration described above will be described with reference to the flowcharts shown in FIGS. 11 and 12 as an example. Prior to the radiography, the operator performs imaging preparation work. The imaging preparation work includes designation of the measurement target part of the bone density, setting of the irradiation condition 63 of the radiation R, positioning of the subject H (adjustment of the position and the posture with respect to the radiation image detector 13 and the radiation source 15), and the like.

In the console 14, the operation program 70 is activated, so that the CPU 57 functions as the first acquisition unit 75, the second acquisition unit 76, the third acquisition unit 77, the specifying unit 78, the extraction unit 79, the calculation unit 80, and the display controller 81. First, as shown in FIG. 11, the operator operates the console 14 to designate the measurement target part of the bone density corresponding to the subject H to which the radiography is to be performed. As a result, the designation information 62 is acquired by the first acquisition unit 75 (step ST100). The designation information 62 is output to the specifying unit 78 from the first acquisition unit 75.

The operator operates the console 14 to set the irradiation condition 63 of the radiation R. Thereafter, the operator guides the subject H from the waiting room to the radiography room. The operator makes the subject H lie down on the decubitus imaging table 12 to perform the positioning of the subject H. After the positioning of the subject H is completed, the operator operates the console 14 to issue the imaging instruction for the optical image 25 (YES in step ST110). The imaging instruction is transmitted to the camera 19 from the console 14 (step ST120). As a result, as shown in FIG. 3, the optical image 25 is captured by the camera 19.

The optical image 25 from the camera 19 is acquired by the second acquisition unit 76 (step ST130). The optical image 25 is output to the specifying unit 78 from the second acquisition unit 76.

As shown in FIG. 8, in the specifying unit 78, the SS processing using the SS model 71 is performed on the optical image 25, and the SS image 90 in which the region MTA of each measurement target part is identified is output. Then, in the region MTA of each measurement target part, the region MTA of the measurement target part designated by the designation information 62 is specified as the region SA of the measurement target part (step ST140). The specific region information 85, which is the coordinate information of the region SA of the measurement target part, is output to the extraction unit 79 from the specifying unit 78.

As shown in FIG. 9, the region in the radiation image 30 corresponding to the region SA of the measurement target part is extracted as the measurement region EA of the bone density by the extraction unit 79 based on the correspondence relationship information 72 and the specific region information 85 (step ST150). The extraction region information 86, which is the coordinate information of the measurement region EA of the bone density, is output to the calculation unit 80 from the extraction unit 79.

The operator instructs the subject H to inhale and stop. Thereafter, the operator operates the irradiation switch 18 to instruct the radiation source 15 to start the irradiation with the radiation R. As a result, the radiation R is emitted from the radiation source 15 toward the subject H.

The radiation R transmitted through the subject H reaches the radiation image detector 13. Then, it is detected as the radiation image 30 by the radiation image detector 13. The radiation image 30 is output from the radiation image detector 13 to the console 14. As shown in FIG. 12, in the console 14, the radiation image 30 is acquired by the third acquisition unit 77 (step ST200). The radiation image 30 is subjected to various types of image processing and then is output to the calculation unit 80 and the display controller 81.

As shown in FIG. 9, the calculation unit 80 calculates the bone density of the measurement region EA (step ST210). The bone density information 87 obtained in this way is output from the calculation unit 80 to the display controller 81.

As shown in FIG. 10, under the control of the display controller 81, the measurement result display screen 95 is displayed on the display 20, and the measurement result of the bone density is provided for viewing by the operator (step ST220).

As described above, the CPU 57 of the console 14 comprises the first acquisition unit 75, the second acquisition unit 76, the specifying unit 78, and the extraction unit 79. The first acquisition unit 75 acquires the designation information 62 of the measurement target part of the bone density of the subject H. The second acquisition unit 76 acquires the optical image 25 obtained by imaging the subject H facing the radiography with the camera 19. The specifying unit 78 specifies the region SA of the measurement target part in the optical image 25 based on the designation information 62. The extraction unit 79 extracts the region in the radiation image 30 corresponding to the region SA of the measurement target part as the measurement region EA of the bone density based on the correspondence relationship information 72 between the pixels RI (x, y) of the radiation image 30 and the pixels OI (X, Y) of the optical image 25.

As described above, in the technology of the present disclosure, the measurement region EA of the bone density is extracted based on the optical image 25. Therefore, it is not necessary to perform the pre-imaging by the irradiation with the radiation R in order to demarcate the measurement region EA of the bone density as in the related-art case. Therefore, the extra exposure to the subject H can be reduced. In addition, a time required for the radiography can be shortened, and the stress on the subject H due to the restraint for a long time can be reduced.

The specifying unit 78 specifies the region SA of the measurement target part by performing the SS processing of identifying the object on the optical image 25. Therefore, the region SA of the measurement target part can be specified only by simple processing of inputting the optical image 25 to the SS model 71.

Second Embodiment

Figure 13:
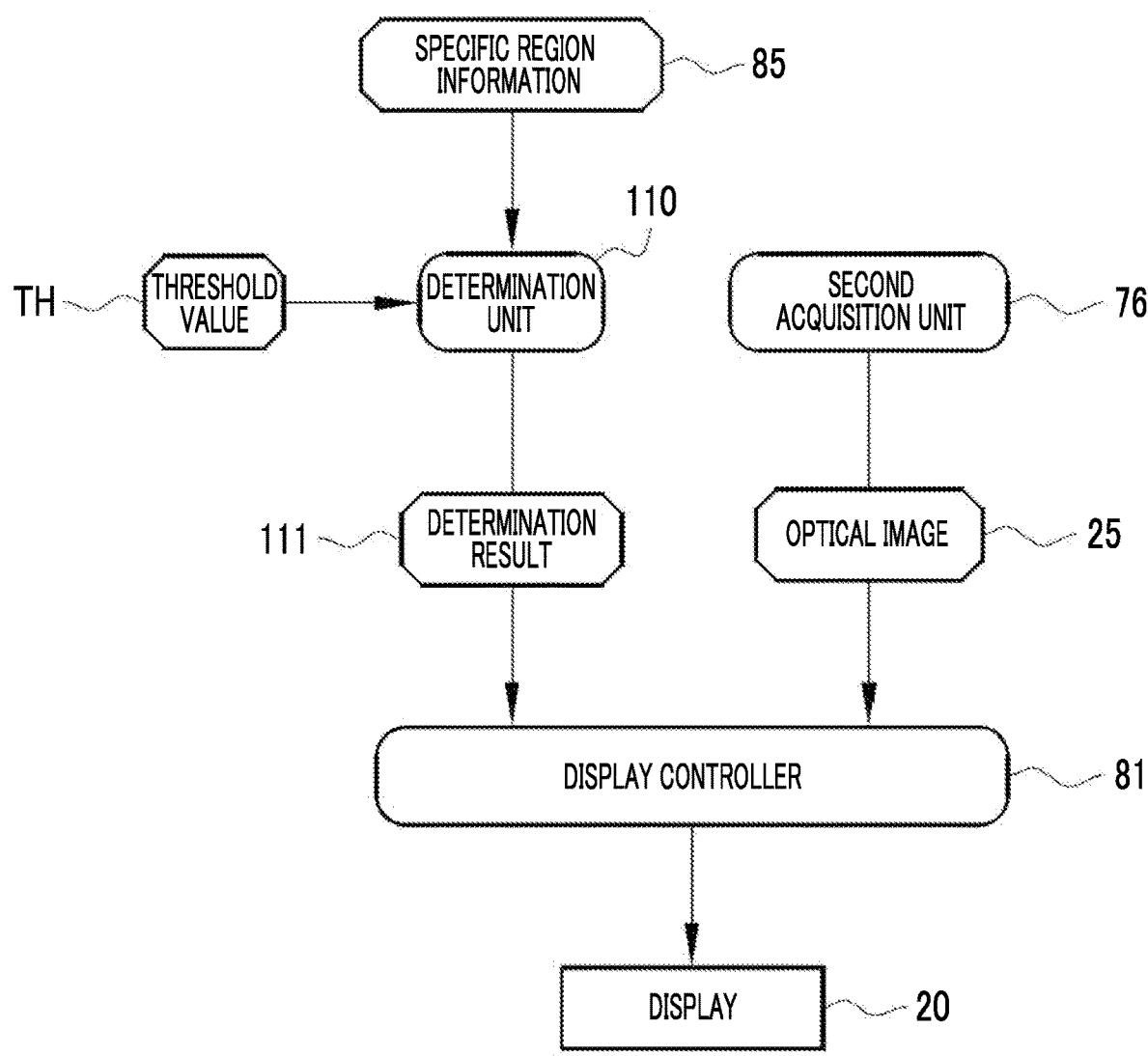
FIG. 13 is a diagram showing a second embodiment in which it is determined whether or not positioning of the subject is appropriate based on an area of a region of a measurement target part.

As shown in FIG. 13 as an example, the CPU 57 of the console 14 according to the second embodiment functions as a determination unit 110, in addition to the processing units 75 to 81 (not shown except for the second acquisition unit 76 and the display controller 81) according to the first embodiment.

The specific region information 85 from the specifying unit 78 is input to the determination unit 110. The determination unit 110 compares an area (number of pixels) of the region SA of the measurement target part represented by the specific region information 85 with a preset threshold value TH. The determination unit 110 determines whether or not the positioning of the subject H is appropriate depending on whether or not the area of the region SA of the measurement target part is equal to or larger than the threshold value TH. The determination unit 110 outputs a determination result 111 of whether or not the positioning of the subject H is appropriate to the display controller 81.

Here, in the second embodiment, the second acquisition unit 76 sequentially acquires the optical images 25 output from the camera 19 at a predetermined frame rate. The second acquisition unit 76 outputs the optical image 25 to the display controller 81.

Figure 14A:
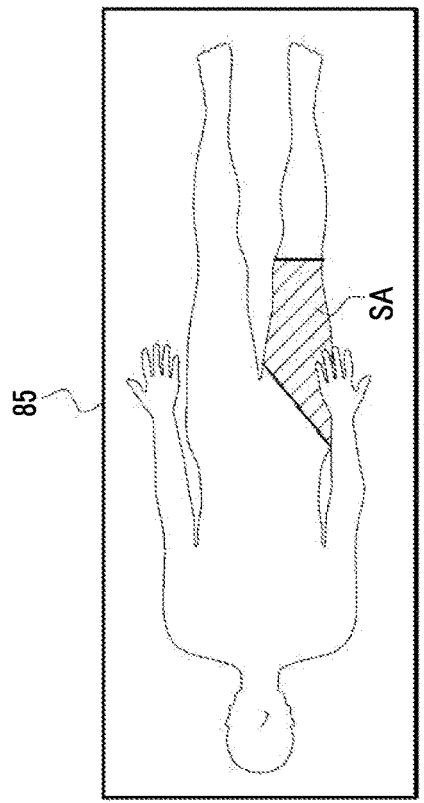
Figure 14B:
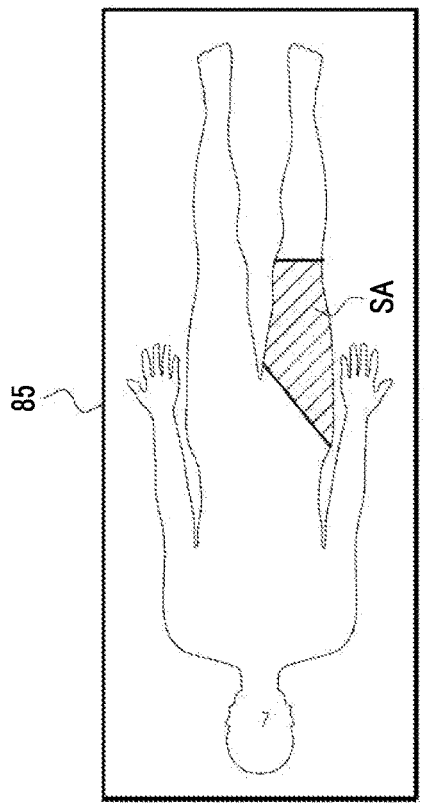

As shown in FIG. 14A as an example, in a case in which the area of the region SA of the measurement target part is equal to or larger than the threshold value TH, the determination unit 110 outputs the determination result 111 indicating that the positioning of the subject H is appropriate. On the other hand, as shown in FIG. 14B as an example, in a case in which the area of the region SA of the measurement target part is less than the threshold value TH, the determination unit 110 outputs the determination result 111 indicating that the positioning of the subject H is not appropriate (inappropriate). FIG. 14B shows a case in which the measurement target part is the right thigh portion and the hand of the subject H covers the right thigh portion.

Figure 15:
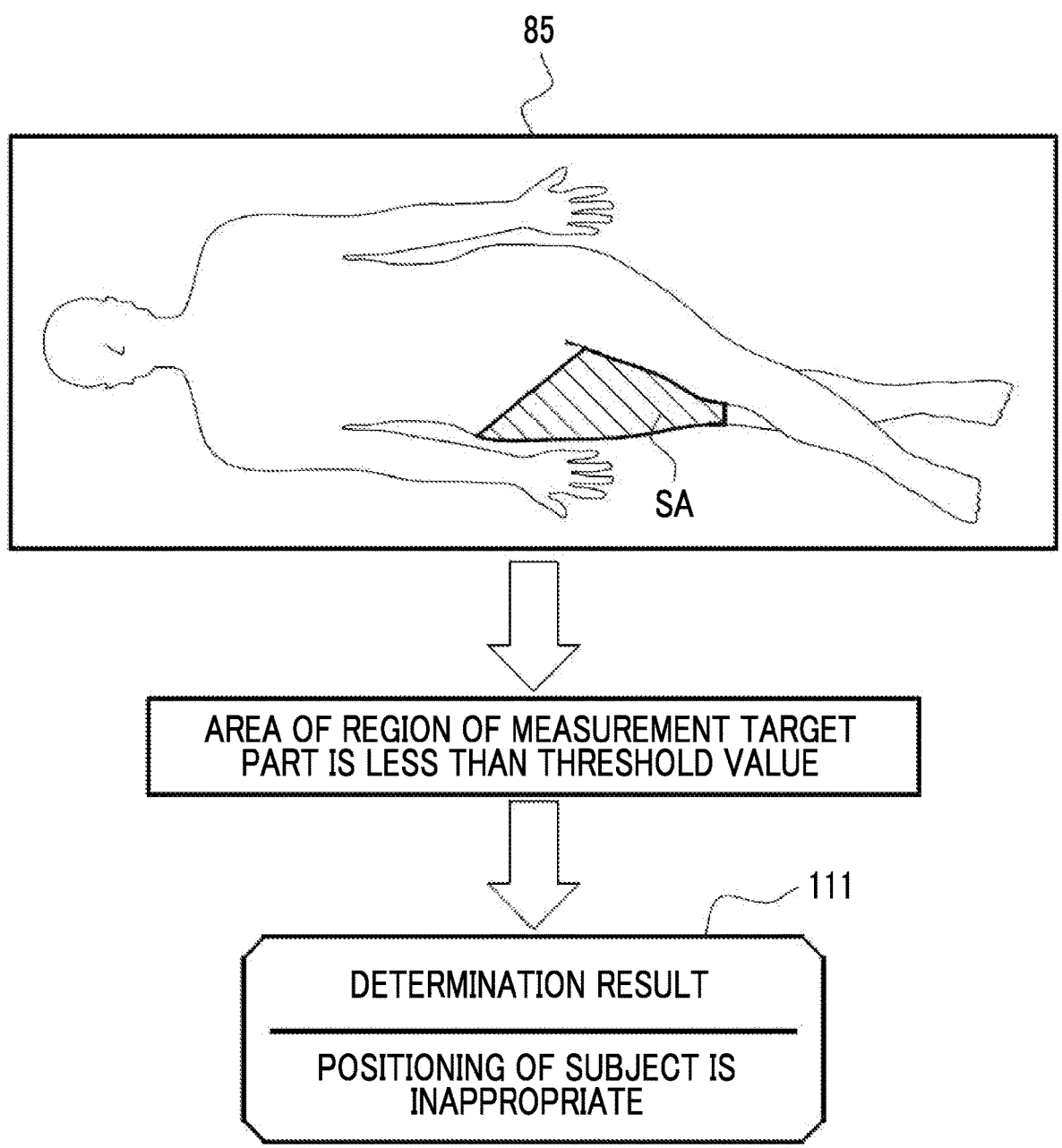
FIG. 15 is a diagram showing processing of the determination unit, and is a diagram showing another example in a case in which it is determined that the positioning of the subject is not appropriate.

FIG. 15 shows another example in which the determination unit 110 determines that the positioning of the subject H is not appropriate. FIG. 15 shows a case in which the measurement target part is the right thigh portion as in FIGS. 14A and 14B and the left thigh portion of the subject H covers the right thigh portion.

Figure 16:
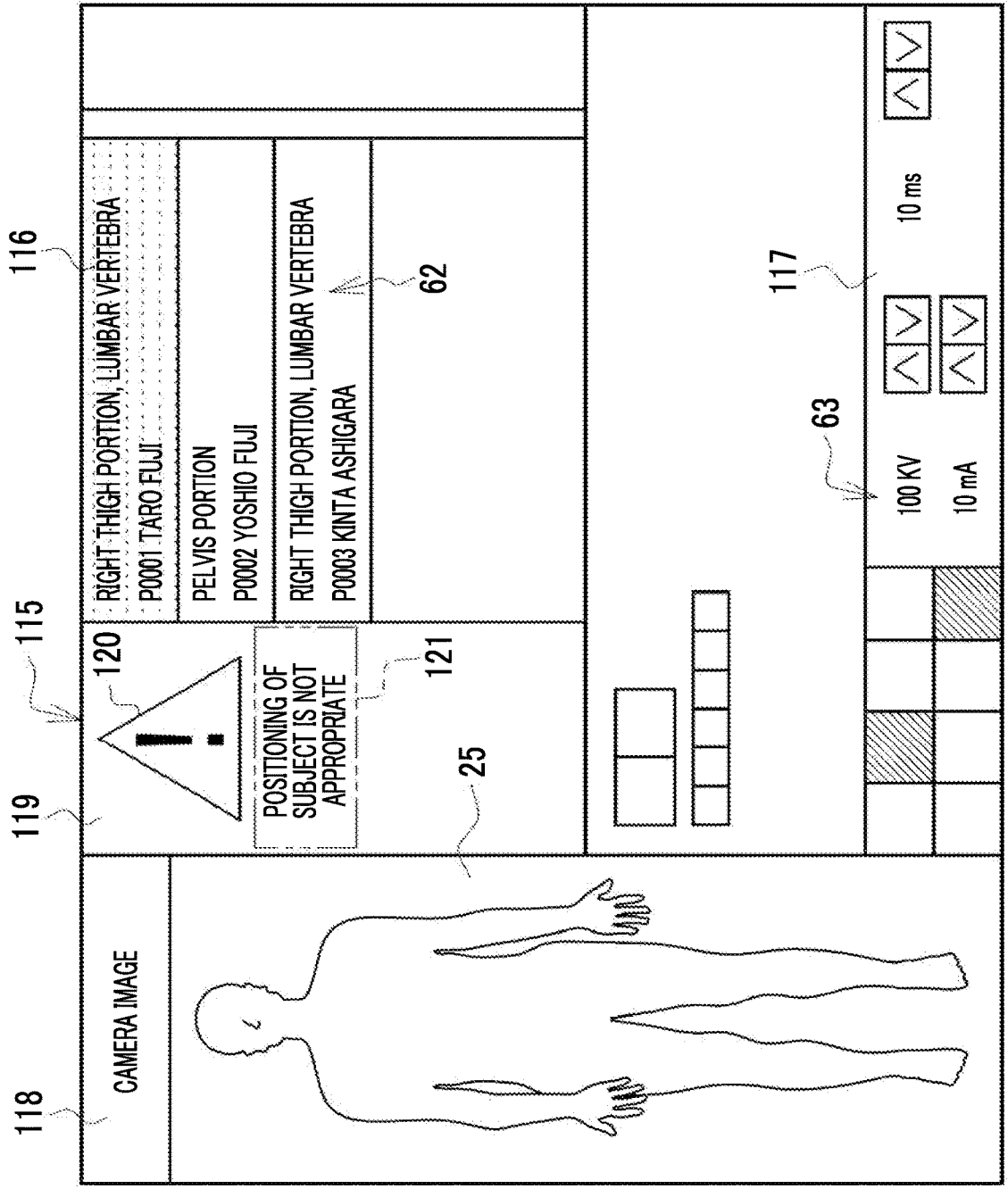
FIG. 16 is a diagram showing an information display screen in a case in which the area of the region of the measurement target part is less than the threshold value.

As shown in FIG. 16 as an example, an information display screen 115 is displayed on the display 20 under the control of the display controller 81. The information display screen 115 has a display region 116 of the designation information 62 and a display region 117 of the irradiation condition 63. In the display region 116, a set of the designation information 62, the subject ID 131 (P0001, P0002, or the like), and the name of the subject H that have been input so far is displayed side by side. The designation information 62 of the currently performed radiography is displayed in a color different from that of the other designation information 62 as indicated by hatching. The display region 117 displays the tube voltage, the tube current, and the irradiation time under the irradiation condition 63 in an adjustable state.

The information display screen 115 also includes a display region 118 of the optical image 25 and a display region 119 of the information corresponding to the determination result 111. The display controller 81 displays the optical images 25 output from the camera 19 at a predetermined frame rate in the display region 118 while sequentially updating the optical image 25. That is, the optical image 25 displayed in the display region 118 is a live view image (moving image).

FIG. 16 shows the information display screen 115 in the case of FIG. 14B in which the hand of the subject H covers the right thigh portion and the determination unit 110 determines that the positioning of the subject H is not appropriate. In this case, an exclamation mark 120 and a message 121 indicating that the positioning of the subject H is not appropriate are displayed in the display region 119. In this case, the operator instructs the subject H to move his/her hand away from the right thigh portion. It should be noted that, although not shown, in a case in which the determination unit 110 determines that the positioning of the subject H is appropriate, for example, a circle mark and a message indicating that the positioning of the subject H is appropriate are displayed in the display region 119.

As described above, in the second embodiment, the determination unit 110 determines that the positioning of the subject H is not appropriate in a case in which the area of the region SA of the measurement target part is less than the preset threshold value TH. The display controller 81 displays the exclamation mark 120 and the message 121 in the display region 119, and outputs the information corresponding to the determination result 111. Therefore, whether or not the positioning of the subject H is appropriate can be easily determined without bothering the operator. It is possible to prevent the subject H from being unnecessarily exposed to exposure due to an imaging failure due to the radiography performed in a state in which the positioning of the subject H is not appropriate. In addition, the probability of obtaining the radiation image 30 suitable for the diagnosis is increased.

Although the right thigh portion is described as an example of the measurement target part, another measurement target part, for example, the left thigh portion, the right shin portion, or the left shin portion may be used. In addition, a plurality of threshold values TH may be set in accordance with the attribute of the subject H, such as gender, age, and body type.

Instead of or in addition to the notification indicating that the positioning of the subject H is not appropriate through the information display screen 115, the notification indicating that the positioning of the subject H is not appropriate may be performed by voice. In addition, an indicator, such as a warning lamp, may be used for the notification.

Third Embodiment

In the first embodiment, the region SA of the measurement target part is specified by performing the SS processing on the optical image 25, but the present disclosure is not limited to this.

Figure 17:
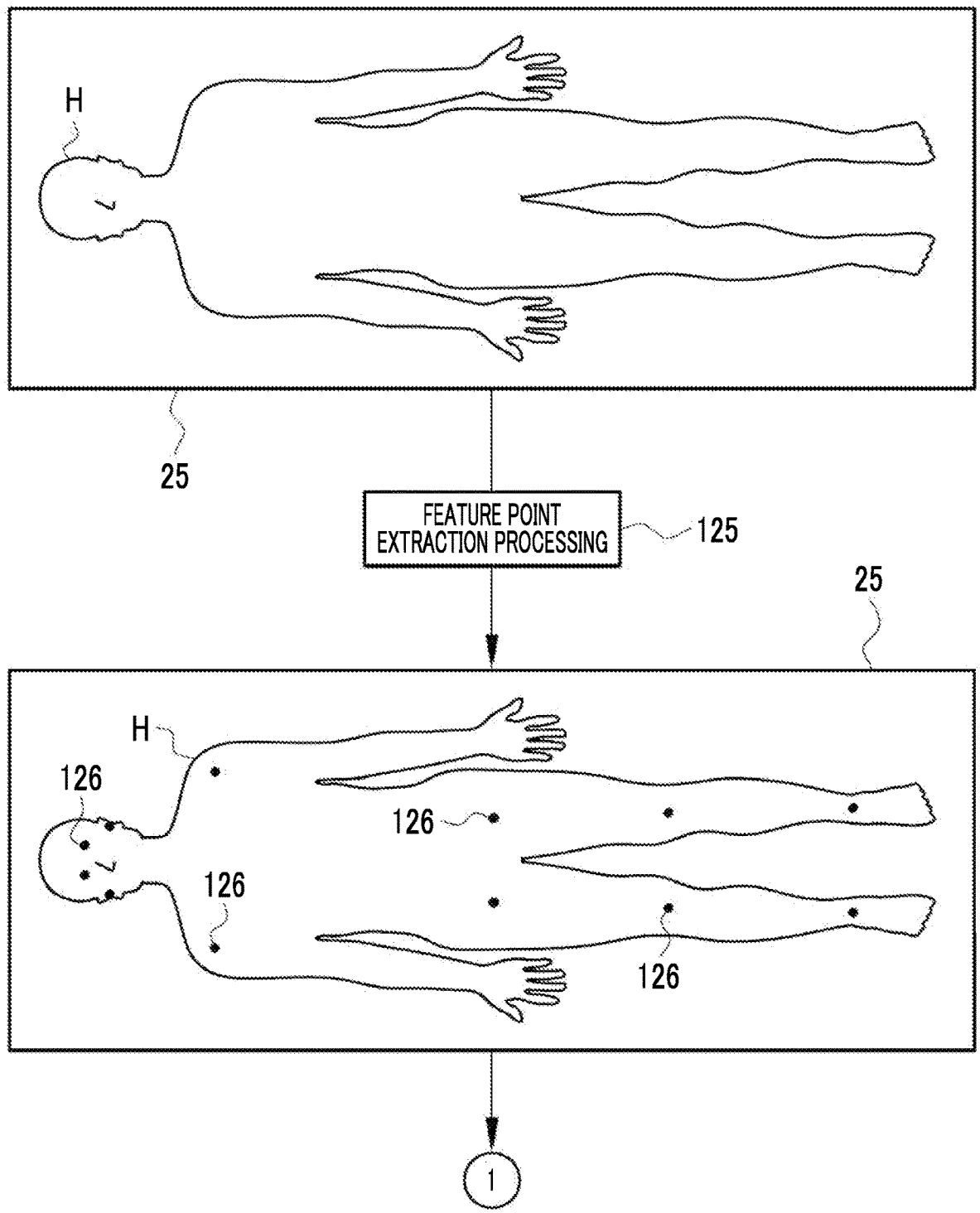
FIG. 17 is a diagram showing a state in which feature point extraction processing of extracting a feature point is performed on the optical image.

As shown in FIG. 17 as an example, the specifying unit 78 according to the third embodiment performs feature point extraction processing 125 on the optical image 25 instead of the SS processing. The feature point extraction processing 125 is processing of extracting a feature point 126 of the subject H shown in the optical image 25 by using a well-known image recognition technology or a machine learning model. From the top, the feature points 126 are right and left orbital points, right and left external auditory canal points, right and left shoulder joint points, right and left hip joint points, right and left knee joint points, and right and left ankle joint points. As is well known, an orbit is a depression in which an eyeball is accommodated, and the orbital point is a center point of the depression. An external auditory canal is a so-called ear canal, and the external auditory canal point is a center point of the ear canal. The shoulder joint point is a connection point between a shoulder blade and a humerus. The hip joint point is a connection point between a hip bone and a femoral bone. The knee joint point is a connection point between the femoral bone and a shinbone. The ankle joint point is the connection point between the shinbone and a talus.

Figure 18:
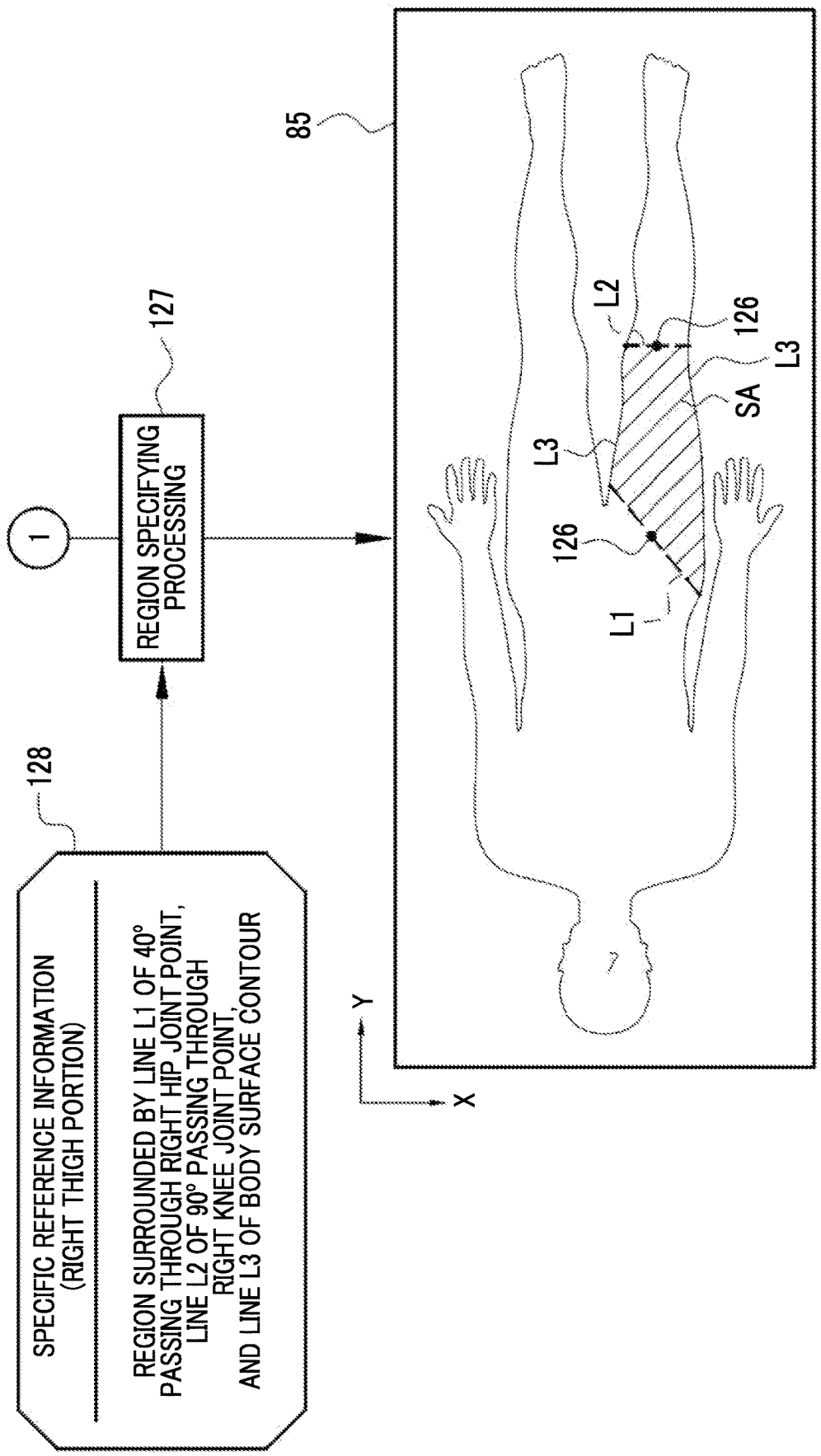
FIG. 18 is a diagram showing a state in which the region of the measurement target part is specified based on the feature point.
Figure 19:
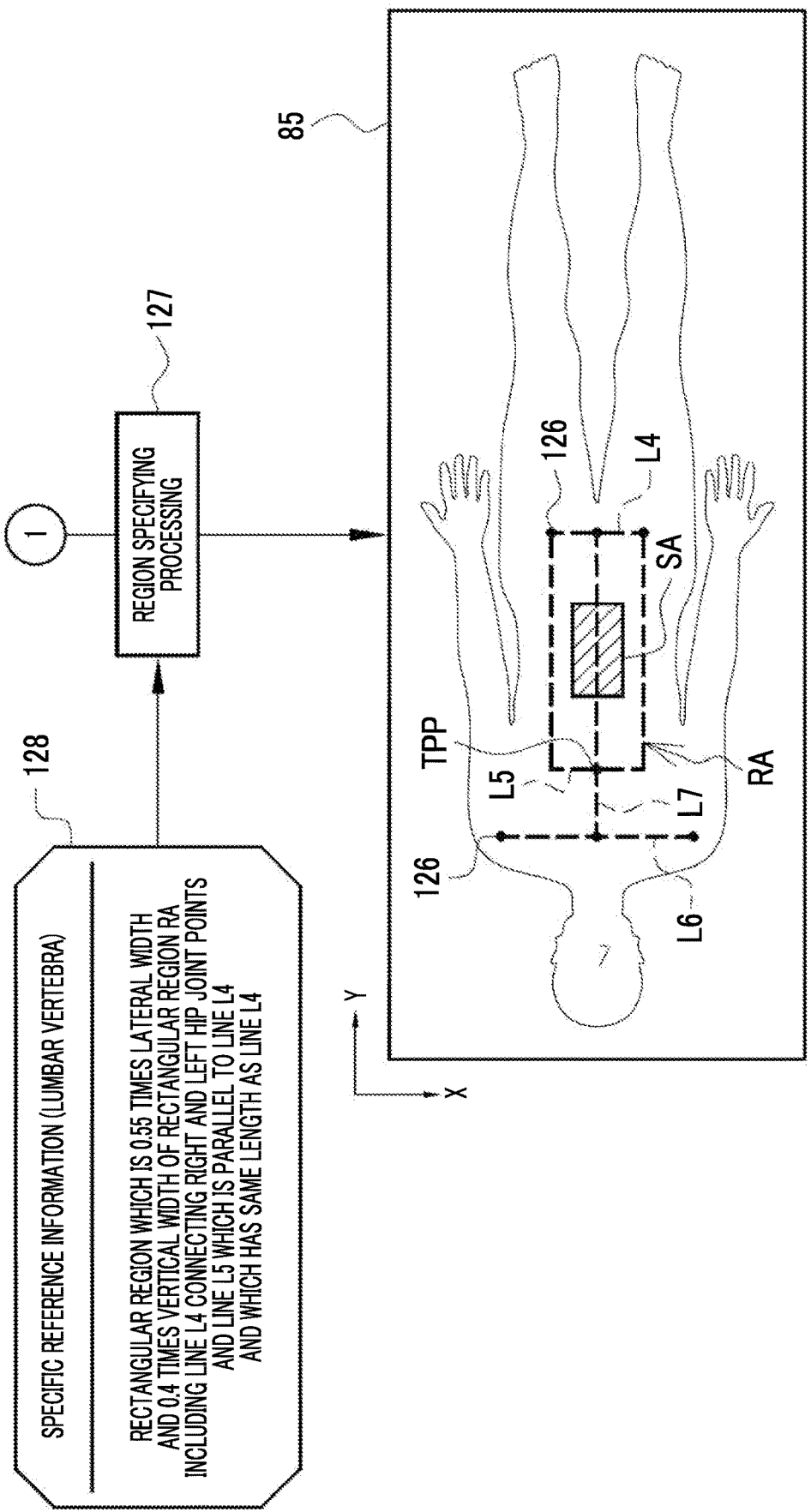
FIG. 19 is a diagram showing a state in which the region of the measurement target part is specified based on the feature point.

As shown in FIGS. 18 and 19 as an example, the specifying unit 78 performs region specifying processing 127 on the optical image 25 after the feature point extraction processing 125. The region specifying processing 127 is processing of specifying the region SA of the measurement target part based on the feature point 126 with reference to specific reference information 128.

FIG. 18 shows a case in which the measurement target part is the right thigh portion. In this case, the specific reference information 128 is a content indicating that a region surrounded by a line L1 of 40° passing through the right hip joint point, a line L2 of 90° passing through the right knee joint point, and a line L3 of a body surface contour is set as a region of the right thigh portion. The specifying unit 78 draws the line L1 of 40° passing through the right hip joint point and the line L2 of 90° passing through the right knee joint point. In addition, the body surface contour of the subject H is extracted by using the well-known image recognition technology or the machine learning model. The specifying unit 78 specifies the region surrounded by the lines L1 and L2, and the line L3 of the body surface contour as the region SA of the right thigh portion. Then, the coordinate information of the pixels OI (X, Y) constituting the region SA of the right thigh portion is output to the extraction unit 79 as the specific region information 85. It should be noted that the angles, such as "40°" and "90°", are angles with respect to the Y-axis of the optical image 25.

FIG. 19 shows a case in which the measurement target part is the lumbar vertebra. In this case, the specific reference information 128 is a content indicating that a rectangular region, which is 0.55 times the width of the short side and 0.4 times the width of the long side of the rectangular region RA including a line L4 connecting the right and left hip joint points and a line L5 which is parallel to the line L4 and which has the same length as the line L4, is set as the region of the lumbar vertebra. Here, the line L5 is a line passing through a point TPP at a distal end of the line which is 0.8 times the length of a line L7 connecting a midpoint of the line L4 and a midpoint of a line L6 connecting the right and left shoulder joint points. The specifying unit 78 draws the line L4 and the line L5, and specifies a region, which is 0.55 times the width of the short side of the rectangular region RA generated by the drawing and 0.4 times the width of the long side, as the region SA of the lumbar vertebra. Then, the coordinate information of the pixels OI (X, Y) constituting the region SA of the lumbar vertebra is output to the extraction unit 79 as the specific region information 85. It should be noted that the numerical values, such as "0.55 times", "0.4 times", and "0.8 times", are statistically obtained from the data of a large number of unspecified subjects H in the past. The numerical value may be changed in accordance with the attribute of the subject H, such as the gender, the age, and the body type.

As described above, in the third embodiment, the specifying unit 78 performs the feature point extraction processing 125 of extracting the feature points 126 on the optical image 25, and specifies the region SA of the measurement target part based on the feature points 126. By such a method, the region SA of the measurement target part can also be specified. In a case in which the SS processing is performed on the optical image 25, it is necessary to prepare the SS model 71, but in the third embodiment, such time and effort can be saved.

It should be noted that, in a case in which the measurement target part is the head portion, the specifying unit 78 specifies the region SA of the head portion by using the right and left orbital points and the right and left external auditory canal points. In a case in which the measurement target part is the pelvis portion, the specifying unit 78 specifies the region SA of the pelvis portion by using the hip joint point. In addition, in a case in which the measurement target part is the right and left shin portions, the specifying unit 78 specifies the region SA of the right and left shin portions by using the right and left knee joint points and the right and left ankle joint points.

Fourth Embodiment

Figure 20:
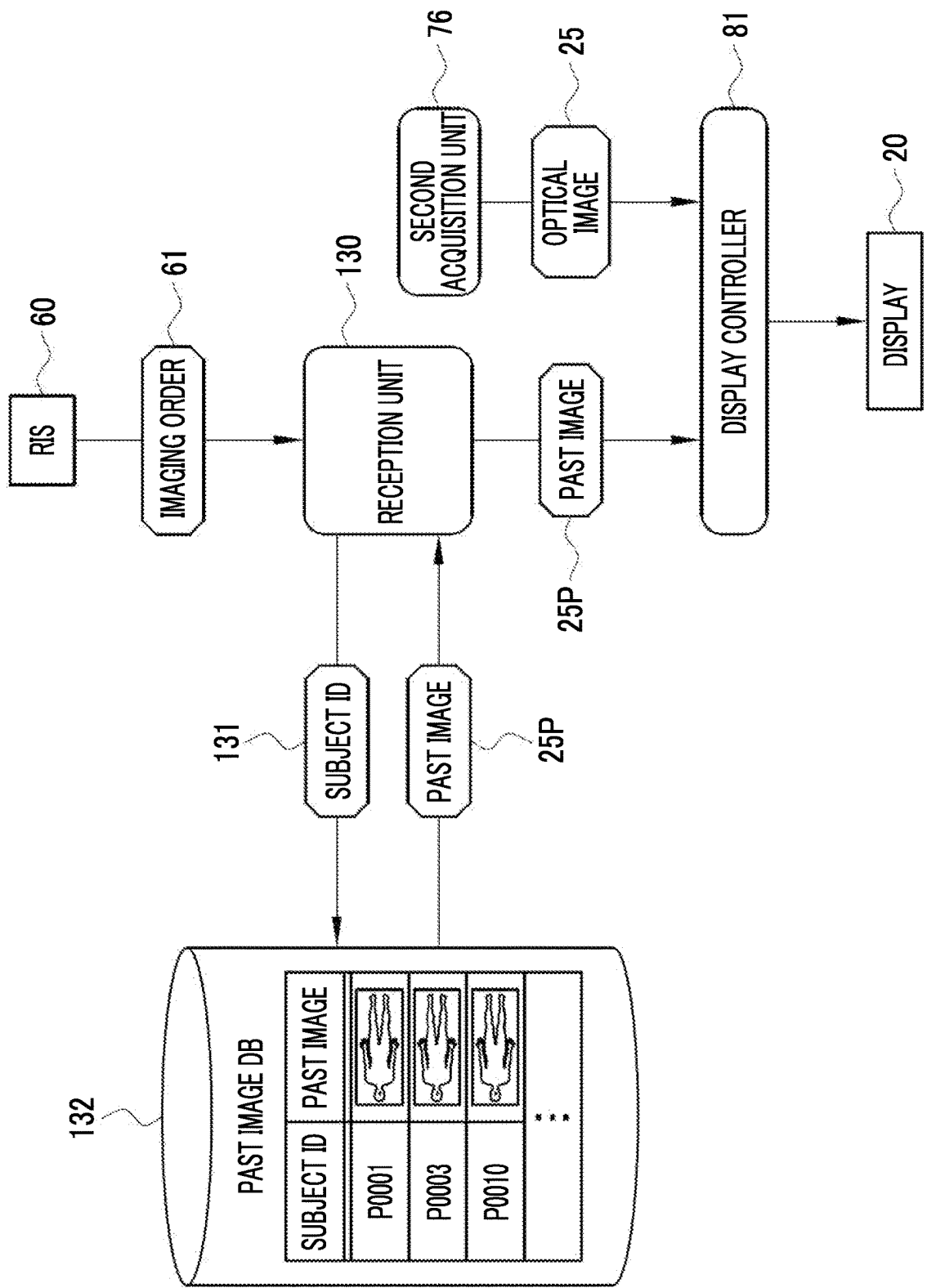
FIG. 20 is a diagram showing a fourth embodiment in which control of displaying a past optical image on a display in a manner of being superimposed on a current optical image is performed.

As shown in FIG. 20 as an example, the CPU 57 of the console 14 according to the fourth embodiment functions as a reception unit 130, in addition to the processing units 75 to 81 (not shown except for the second acquisition unit 76 and the display controller 81) according to the first embodiment.

The reception unit 130 receives the imaging order 61 from the RIS 60. The reception unit 130 outputs the subject ID 131 included in the imaging order 61 to a past image database (hereinafter, referred to as DB) 132. In the past image DB 132, a set of the subject ID 131 of the subject H who has been subjected to the radiography in the past by the radiography system 2 and a past image 25P which is the past optical image 25 obtained by imaging the subject H of the subject ID 131 with the camera 19 during the past radiography is stored. The past image 25P is one still image captured by the camera 19 in response to the imaging instruction during the latest radiography.

The past image DB 132 receives the subject ID 131 from the reception unit 130, reads out the past image 25P corresponding to the subject ID 131, and transmits the read out past image 25P to the reception unit 130. The reception unit 130 outputs the past image 25P to the display controller 81. In a case in which the subject ID 131 from the reception unit 130 is not registered, the past image DB 132 transmits to the reception unit 130 that the subject ID 131 is not registered.

Here, in the fourth embodiment, as in the third embodiment, the second acquisition unit 76 sequentially acquires the optical images 25 output from the camera 19 at a predetermined frame rate. The second acquisition unit 76 outputs the optical image 25 to the display controller 81.

Figure 21:
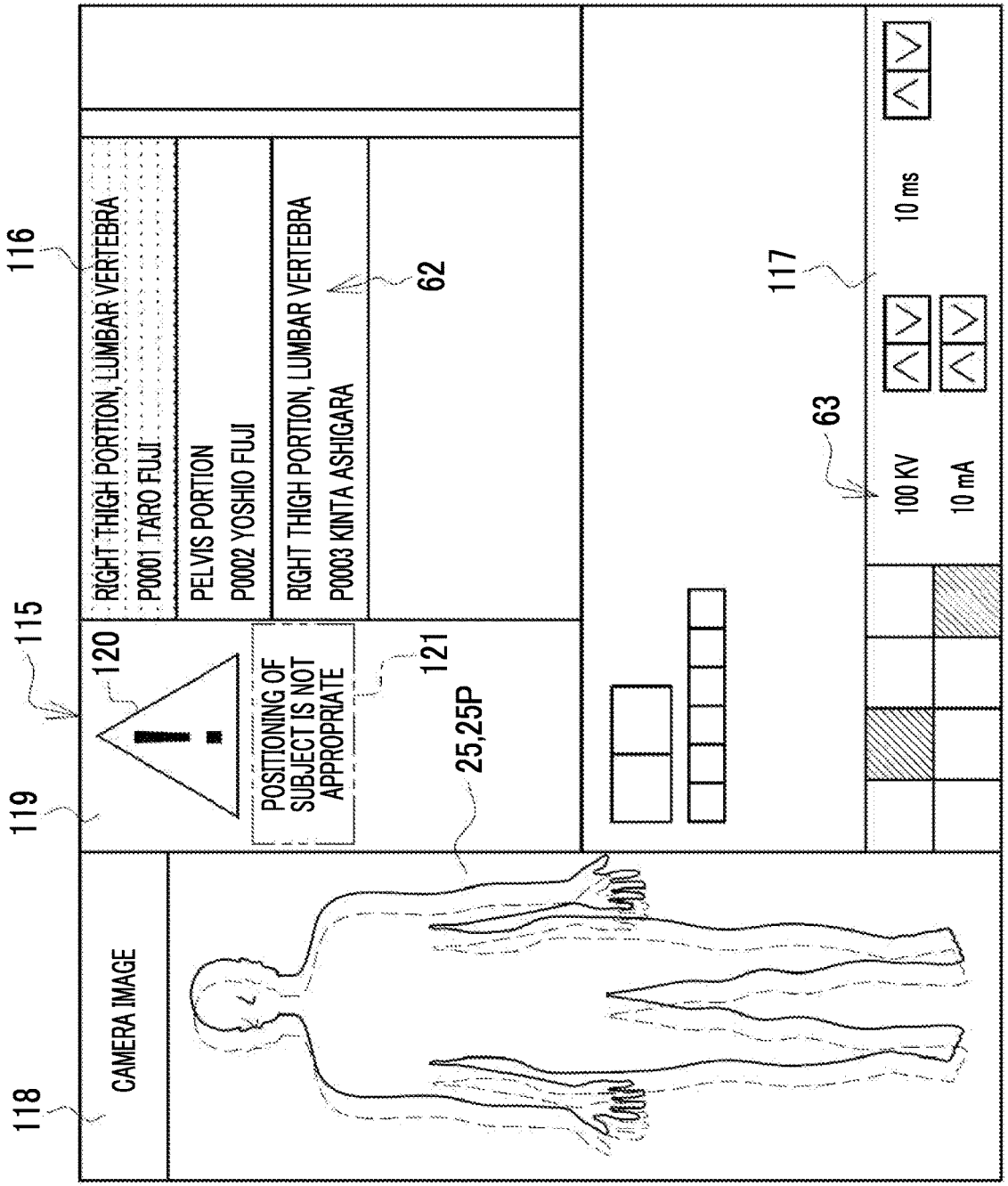
FIG. 21 is a diagram showing the information display screen in which the past optical image is displayed in a manner of being superimposed on the current optical image.

As shown in FIG. 21 as an example, in a case of the preparation for the imaging before the radiography, the display controller 81 displays the current optical image 25, which is a moving image, and the past image 25P, which is a still image, in the display region 118 of the information display screen 115 in a superimposed manner. As shown by a broken line, the past image 25P is displayed with a transparency of, for example, 50%. It should be noted that, in a case in which the reception unit 130 receives that the subject ID 131 is not registered, a dialog box including a message indicating that the past image 25P is not present is displayed on the information display screen 115 in a pop-up manner.

FIG. 21 shows a case in which the position of the subject H shown in the current optical image 25 and the position of the subject H shown in the past image 25P are separated by a threshold value or larger. In this case, as in the second embodiment, the exclamation mark 120 and the message 121 indicating that the positioning of the subject H is not appropriate are displayed in the display region 119.

Whether or not the position of the subject H shown in the current optical image 25 and the position of the subject H shown in the past image 25P are separated from each other by a threshold value or larger is determined as follows, for example. That is, the feature point extraction processing 125 shown in the third embodiment is performed on each of the current optical image 25 and the past image 25P. Then, a distance between the feature point 126 of the current optical image 25 and the feature point 126 of the past image 25P is calculated, and the calculated distance is compared with a preset threshold value.

As described above, in the fourth embodiment, in a case in which the subject H, which has been subjected to the radiography in the past, is subjected to the radiography again, in a case of the preparation for imaging before the radiography, the display controller 81 performs control of displaying the past image 25P which is the optical image 25 obtained during the past radiography on the display 20 in a manner of being superimposed on the current optical image 25. Therefore, the operator can easily confirm how much the current position of the subject H deviates from the position of the subject H in the past radiography. The operator can instruct the correction of the positioning of the subject H in order to eliminate the deviation from the position during the past radiography, and can easily match the current position of the subject H with the position during the past radiography.

As shown in FIG. 1, the irradiation width of the radiation R in the head-caudal direction of the subject H is narrowed down by the irradiation field limiter 23. However, as shown in FIG. 2, the irradiation width of the radiation R in the right-left direction of the subject H is not narrowed down by the irradiation field limiter 23. Therefore, in a case in which the current position of the subject H deviates from the position during the past radiography in the right-left direction of the subject H, the irradiation angle of the radiation R with respect to the subject H is changed between the past and the present, so that the measurement reproducibility of the bone density is lost. However, according to the fourth embodiment, since the current position of the subject H can be matched with the position during the past radiography as described above, the measurement reproducibility of the bone density can be ensured.

Instead of or in addition to the notification indicating that the positioning of the subject H is not appropriate through the information display screen 115, the notification indicating that the positioning of the subject H is not appropriate may be performed by voice. In addition, an indicator, such as a warning lamp, may be used for the notification.

Fifth Embodiment

In the fifth embodiment shown below, a position adjustment support function of supporting the position adjustment of a radiation source 140 is executed in the preparation for the imaging before the radiography.

Figure 22:
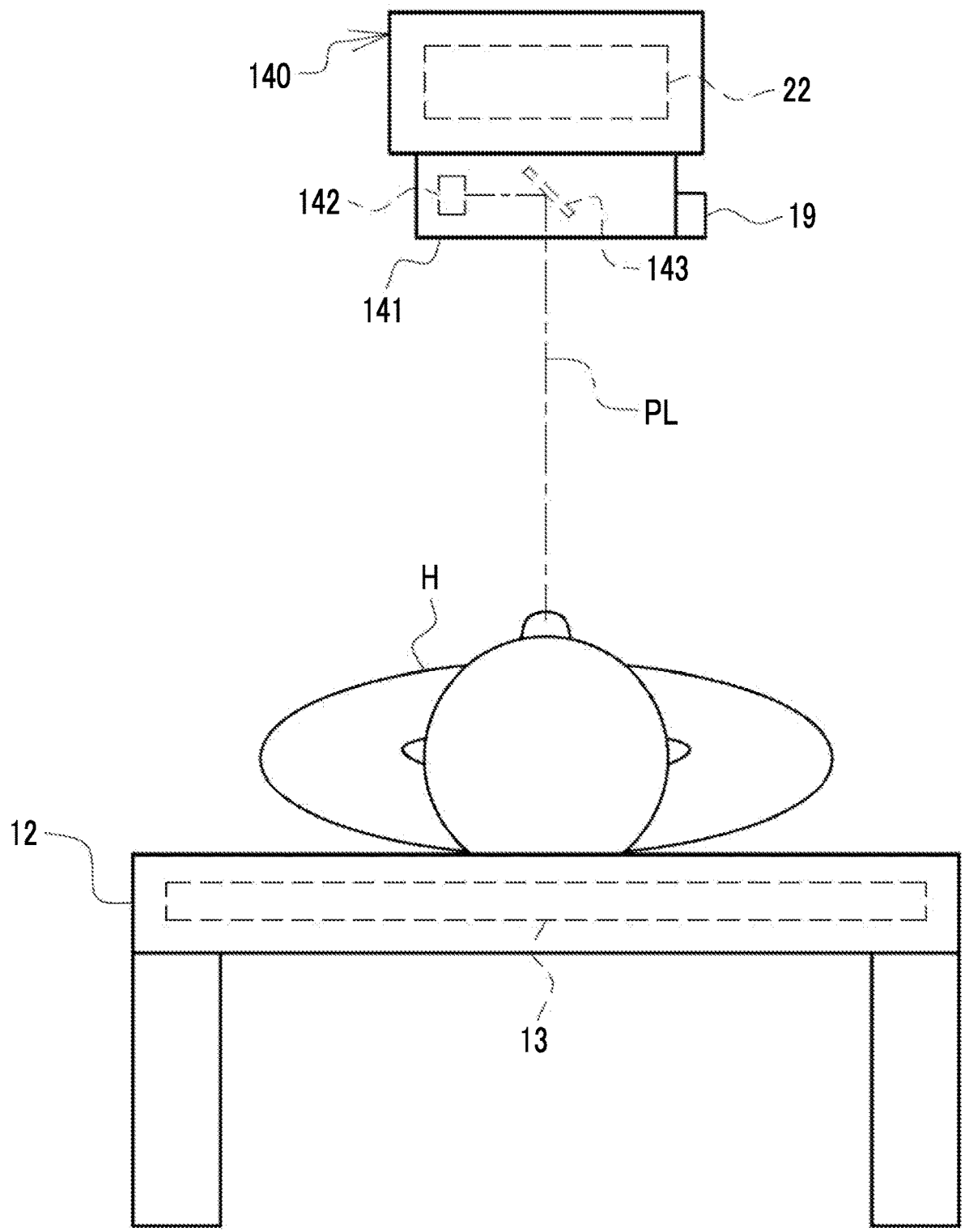
FIG. 22 is a diagram showing a light source that emits position display light indicating a position of a radiation source.

As shown in FIG. 22 as an example, in the radiation source 140 of the fifth embodiment, a light source 142 and a mirror 143 are provided in an irradiation field limiter 141. The light source 142 is, for example, a semiconductor laser, and is attached to an inner side surface of the irradiation field limiter 141. The light source 142 emits position display light PL indicating the position of the radiation source 140, more specifically, the irradiation center of the radiation R. The mirror 143 is provided in the center of an inner space of the irradiation field limiter 141, and reflects the position display light PL from the light source 142 downward. During the irradiation with the radiation R, the mirror 143 is retracted from an irradiation path of the radiation R so as not to interfere with the irradiation with the radiation R. It should be noted that the position display light PL is set to an amount of light according to the regulations of the Japanese Industrial Standards such that an obstacle does not occur even in a case in which the position display light PL accidentally enters the eyes of the subject H.

Figure 23:
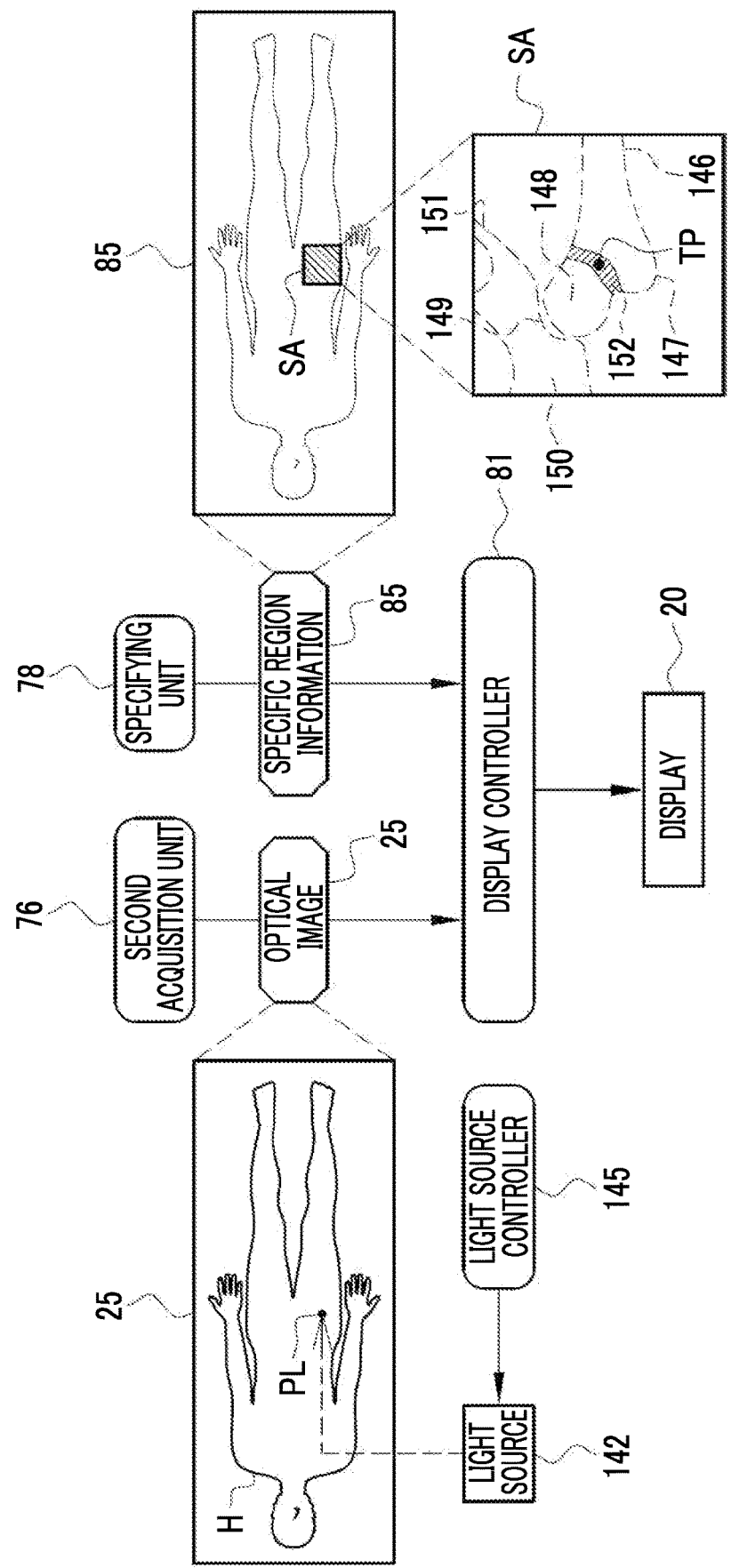
FIG. 23 is a diagram showing an outline of a position adjustment support function of supporting position adjustment of the radiation source.

As shown in FIG. 23 as an example, in the CPU 57 of the console 14 according to the fifth embodiment functions as a light source controller 145, in addition to the processing units 75 to 81 (not shown except for the second acquisition unit 76, the specifying unit 78, and the display controller 81) according to the first embodiment.

The light source controller 145 controls an operation of the light source 142. More specifically, the light source controller 145 controls turning on/off of the position display light PL by the light source 142 in response to an instruction from the operator through the input device 21.

Here, in the fifth embodiment, as in the second embodiment and the fourth embodiment, the second acquisition unit 76 sequentially acquires the optical images 25 output from the camera 19 at a predetermined frame rate. The second acquisition unit 76 outputs the optical image 25 to the display controller 81. In a case in which the position display light PL is emitted from the light source 142 under the control of the light source controller 145, the position display light PL is shown on the optical image 25 together with the subject H. The second acquisition unit 76 acquires the optical image 25 obtained by imaging the subject H irradiated with the position display light PL with the camera 19. In addition to the optical image 25 from the second acquisition unit 76, the display controller 81 also inputs the specific region information 85 from the specifying unit 78.

FIG. 23 shows a case in which the measurement target part is the femoral neck portion and the femoral neck portion is imaged in a pinpoint manner. In this case, the region SA of the measurement target part is a region surrounding the femoral neck portion 152 including a femoral bone 146, a greater trochanter 147, a femoral head 148, an acetabulum 149, an ilium 150, and an ischium 151. The center point of the region SA of the measurement target part matches the center point of the femoral neck portion 152. The center point of the region SA of the measurement target part, and thus the center point of the femoral neck portion 152, is a target point TP of the position of the radiation source 140.

Figure 24:
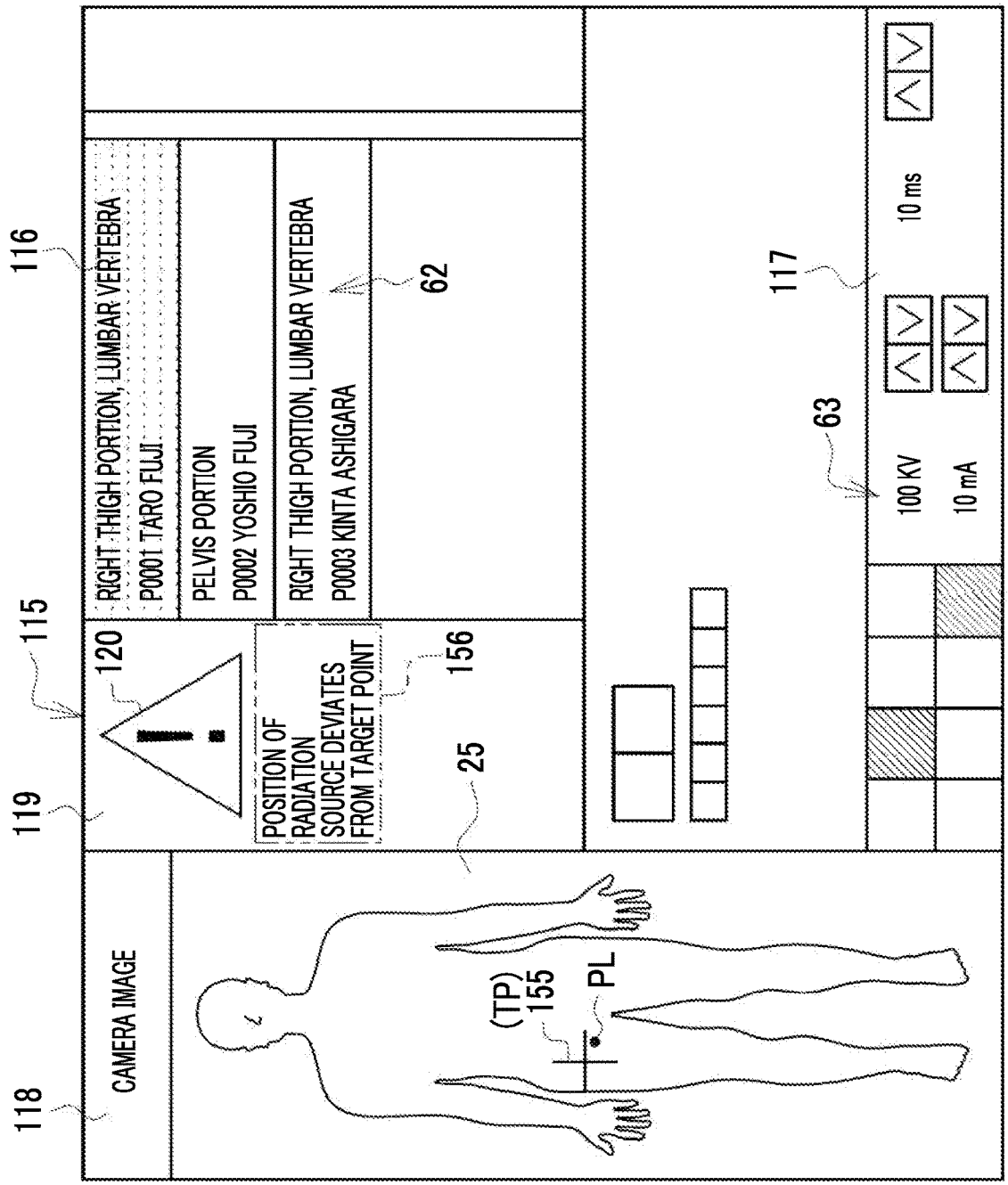
FIG. 24 is a diagram showing the information display screen in which a mark indicating a target point of the position of the radiation source is displayed in a manner of being superimposed on the optical image obtained by imaging the subject irradiated with the position display light with the camera.

As shown in FIG. 24 as an example, the display controller 81 displays a cross-shaped mark 155 indicating the target point TP in a manner of being superimposed on the optical image 25 of the display region 118. By matching the position display light PL with the center of the mark 155, the position of the radiation source 140 is adjusted to a position directly above the target point TP.

FIG. 24 shows a case in which the positions of the position display light PL and the mark 155, that is, the radiation source 140 and the target point TP deviate from each other by a threshold value or larger. In this case, the exclamation mark 120 and a message 156 indicating that the position of the radiation source 140 deviates from the target point TP are displayed in the display region 119.

Whether or not the positions of the position display light PL and the mark 155 deviate from each other by the threshold value or larger is determined as follows, for example. First, the position display light PL is extracted from the optical image 25 by using a well-known image recognition technology. Then, a distance between the position display light PL and the mark 155 is calculated, and the calculated distance is compared with a preset threshold value.

As described above, in the fifth embodiment, in the radiation source 140, the light source 142 that emits the position display light PL indicating the position of the radiation source 140 is provided. The light source controller 145 emits the position display light PL from the light source 142 in a case of the preparation for the imaging. The second acquisition unit 76 acquires the optical image 25 obtained by imaging the subject H irradiated with the position display light PL with the camera 19. The display controller 81 performs control of displaying the mark 155 which is added to the region SA of the measurement target part specified by the specifying unit 78 based on the optical image 25, the mark 155 indicating the target point TP of the position of the radiation source 140, on the display 20 in a manner of being superimposed on the optical image 25. As a result, the position adjustment support function of supporting the position adjustment of the radiation source 140 is realized.

With the position adjustment support function, it is possible to easily match the position of the radiation source 140 with the target point TP. In the related art, the pre-imaging is performed to match the position of the radiation source 140 with the target point TP, but it is possible to save such time and effort with the position adjustment support function. In addition, it is possible to further reduce the extra exposure to the subject H.

The measurement target part is not limited to the femoral neck portion 152 described as an example, and may be, for example, the lumbar vertebra. In a case in which the measurement target part is the lumbar vertebra, the target point TP is, for example, a center point between the lumbar vertebra L2 and the lumbar vertebra L3.

Instead of or in addition to the notification indicating that the position of the radiation source 140 deviates from the target point TP through the information display screen 115, the notification indicating that the position of the radiation source 140 deviates from the target point TP may be performed by voice. In addition, an indicator, such as a warning lamp, may be used for the notification.

In the second embodiment and the fourth embodiment, in a case in which it is determined that the positioning of the subject H is not appropriate, the irradiation with the radiation R by the radiation source 15 may be prohibited. Similarly, in the fifth embodiment, in a case in which the position of the radiation source 140 deviates from the target point TP, the irradiation with the radiation R by the radiation source 140 may be prohibited.

The position of the camera 19 in a case of capturing the optical image 25 is not limited to the home position which is the center position in the long side direction and the short side direction of the decubitus imaging table 12 shown in FIG. 3. The optical image 25 may be captured at any position. It should be noted that, in a case in which the optical image 25 is captured at any position, it is necessary to correct the function F for converting the pixel OI (X, Y) of the optical image 25 into the pixel RI (x, y) of the radiation image 30 in accordance with the positional relationship between the camera 19 and the radiation image detector 13.

The imaging table is not limited to the decubitus imaging table 12 described as an example. An upright imaging table for the radiography of the subject H in an upright posture or a sitting imaging table for the radiography of the subject H in a sitting posture may be used. In addition, the radiation sources 15 and 140 may be a type suspended from the ceiling of the radiography room.

The display may be attached to the decubitus imaging table 12, and the information display screen 115 may be displayed on the display. In this way, the information display screen 115 can be confirmed even in the vicinity of the decubitus imaging table 12. In addition, a guide for the positioning or the like can be displayed on the subject H.

The SS model 71 may identify the bone itself as the region MTA of the measurement target part.

Various screens, such as the measurement result display screen 95 and the information display screen 115, may be transmitted to a portable terminal, such as a tablet terminal owned by the operator, from the console 14, for example, in a form of screen data for web distribution created by markup language, such as extensible markup language (XML). In this case, the portable terminal reproduces various screens to be displayed on the web browser based on the screen data and displays the screens on the display. It should be noted that, instead of the XML, another data description language, such as Javascript (registered trademark) object notation (JSON), may be used.

It is possible to make various modifications with respect to the hardware configuration of the computer constituting the imaging support apparatus according to the technology of the present disclosure. For example, the imaging support apparatus can be composed of a plurality of computers separated as hardware in order to improve the processing capacity and the reliability. For example, the functions of the first acquisition unit 75, the second acquisition unit 76, the third acquisition unit 77, and the specifying unit 78, and the functions of the extraction unit 79, the calculation unit 80, and the display controller 81 are distributed to two computers and carried out. In this case, the two computers constitute the imaging support apparatus.

As described above, the hardware configuration of the computer of the imaging support apparatus can be appropriately changed in accordance with required performance, such as processing capacity, safety, and reliability. Further, it is needless to say that, in addition to the hardware, an application program, such as the operation program 70, can be duplicated or distributed and stored in a plurality of storages for the purpose of securing the safety and the reliability.

In each of the embodiments described above, as the hardware structure of the processing units that execute various processing, such as the first acquisition unit 75, the second acquisition unit 76, the third acquisition unit 77, the specifying unit 78, the extraction unit 79, the calculation unit 80, the display controller 81, the determination unit 110, the reception unit 130, and the light source controller 145, the following various processors can be used. As described above, the various processors include, in addition to the CPU 57, which is a general-purpose processor that executes software (operation program 70) to function as the various processing units, a programmable logic device (PLD), which is a processor of which a circuit configuration can be changed after the manufacturing, such as a field programmable gate array (FPGA), a dedicated electric circuit, which is a processor having a circuit configuration designed exclusively for executing specific processing, such as an application specific integrated circuit (ASIC), and the like.

One processing unit may be composed of one of various processors described above or may be composed of a combination of two or more processors (for example, a combination of a plurality of ASICs and/or a combination of an ASIC and a FPGA) of the same type or different types. In addition, a plurality of the processing units may be composed of one processor.

As an example in which the plurality of processing units are composed of one processor, firstly, as represented by a computer, such as a client and a server, there is a form in which one processor is composed of a combination of one or more CPUs and software, and the processor functions as the plurality of processing units. Second, as represented by a system on chip (SoC) or the like, there is a form in which a processor, which realizes the functions of the entire system including the plurality of processing units with a single integrated circuit (IC) chip, is used. As described above, various processing units are composed of one or more of the various processors as the hardware structure.

Further, as the hardware structure of these various processors, more specifically, it is possible to use an electric circuit (circuitry) in which circuit elements, such as semiconductor elements, are combined.

The technology of the present disclosure can also be appropriately combined with various embodiments and/or various modification examples described above. In addition, it is needless to say that the present disclosure is not limited to each of the embodiments described above, various configurations can be adopted as long as the configuration does not deviate from the gist. Further, the technology of the present disclosure includes, in addition to the program, a storage medium that stores the program in a non-transitory manner.

The described contents and shown contents above are the detailed description of the parts according to the technology of the present disclosure, and are merely an example of the technology of the present disclosure. For example, the above description of the configuration, the function, the action, and the effect are the description of examples of the configuration, the function, the action, and the effect of the parts according to the technology of the present disclosure. Accordingly, it is needless to say that unnecessary parts may be deleted, new elements may be added, or replacements may be made with respect to the described contents and shown contents above within a range that does not deviate from the gist of the technology of the present disclosure. In addition, in order to avoid complications and facilitate grasping the parts according to the technology of the present disclosure, in the described contents and shown contents above, the description of technical general knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, also in a case in which three or more matters are associated and expressed by "and/or", the same concept as "A and/or B" is applied.

All documents, patent applications, and technical standards described in the present specification are incorporated herein by reference to the same extent as in a case in which each document, each patent application, and each technical standard are specifically and individually described by being incorporated by reference.

What is claimed is:

1. An imaging support apparatus that supports radiography of obtaining a radiation image for measuring a bone density of a subject, the apparatus comprising:
    a processor,
    wherein the processor
        acquires designation information of a measurement target part of the bone density,
        acquires an optical image obtained by imaging the subject facing the radiography with a camera,
        specifies a region of the measurement target part in the optical image based on the designation information,
        extracts a region in the radiation image corresponding to the region of the measurement target part as a measurement region of the bone density based on a correspondence relationship between pixels of the radiation image and pixels of the optical image,
        provides a position adjustment support function of supporting position adjustment of a radiation source that has a light source that emits position display light indicating a position of the radiation source and that emits radiation in a case of preparation for imaging before the radiography,
        causes the position display light to be emitted from the light source in a case of the preparation for the imaging,
        acquires the optical image obtained by imaging the subject irradiated with the position display light with the camera, and
        realizes the position adjustment support function by performing control of displaying a mark which is added to the region of the measurement target part specified based on the optical image, the mark indicating a target point of the position of the radiation source, on a display in a manner of being superimposed on the optical image.

2. The imaging support apparatus according to claim 1, wherein the processor specifies the region of the measurement target part by performing semantic segmentation processing of identifying an object on the optical image.

3. The imaging support apparatus according to claim 2, wherein the processor
    determines that positioning of the subject is not appropriate in a case in which an area of the region of the measurement target part specified by the semantic segmentation processing is less than a preset threshold value, and
    outputs information corresponding to a determination result.

4. The imaging support apparatus according to claim 1, wherein the processor
    performs feature point extraction processing of extracting a feature point on the optical image, and
    specifies the region of the measurement target part based on the feature point.

5. The imaging support apparatus according to claim 1, wherein, in a case in which the subject, which has been subjected to the radiography in the past, is subjected to the radiography again, in a case of preparation for imaging before the radiography, the processor performs control of displaying a past optical image obtained during the radiography in the past on a display in a manner of being superimposed on a current optical image.

6. An operation method of an imaging support apparatus that supports radiography of obtaining a radiation image for measuring a bone density of a subject, the method comprising:
    acquiring designation information of a measurement target part of the bone density;
    acquiring an optical image obtained by imaging the subject facing the radiography with a camera;
    specifying a region of the measurement target part in the optical image based on the designation information;
    extracting a region in the radiation image corresponding to the region of the measurement target part as a measurement region of the bone density based on a correspondence relationship between pixels of the radiation image and pixels of the optical image;
    providing a position adjustment support function of supporting position adjustment of a radiation source that has a light source that emits position display light indicating a position of the radiation source and that emits radiation in a case of preparation for imaging before the radiography;
    causing the position display light to be emitted from the light source in a case of the preparation for the imaging;
    acquiring the optical image obtained by imaging the subject irradiated with the position display light with the camera; and
    realizing the position adjustment support function by performing control of displaying a mark which is added to the region of the measurement target part specified based on the optical image, the mark indicating a target point of the position of the radiation source, on a display in a manner of being superimposed on the optical image.

7. A non-transitory computer-readable storage medium storing an operation program of an imaging support apparatus that supports radiography of obtaining a radiation image for measuring a bone density of a subject, the program causing a computer to execute a process comprising:
- acquiring designation information of a measurement target part of the bone density;
- acquiring an optical image obtained by imaging the subject facing the radiography with a camera;
- specifying a region of the measurement target part in the optical image based on the designation information;
- extracting a region in the radiation image corresponding to the region of the measurement target part as a measurement region of the bone density based on a correspondence relationship between pixels of the radiation image and pixels of the optical image;
- providing a position adjustment support function of supporting position adjustment of a radiation source that has a light source that emits position display light indicating a position of the radiation source and that emits radiation in a case of preparation for imaging before the radiography:
- causing the position display light to be emitted from the light source in a case of the preparation for the imaging;
- acquiring the optical image obtained by imaging the subject irradiated with the position display light with the camera; and
- realizing the position adjustment support function by performing control of displaying a mark which is added to the region of the measurement target part specified based on the optical image, the mark indicating a target point of the position of the radiation source, on a display in a manner of being superimposed on the optical image.

* * * * *